США005220250A

United States Patent [19]
Szuba

[11] Patent Number: 5,220,250
[45] Date of Patent: * Jun. 15, 1993

[54] FLUORESCENT LAMP LIGHTING ARRANGEMENT FOR "SMART" BUILDINGS

[75] Inventor: Stefan F. Szuba, Park Ridge, Ill.

[73] Assignee: North American Philips Corp., New York, N.Y.

[*] Notice: The portion of the term of this patent subsequent to Jul. 14, 2009 has been disclaimed.

[21] Appl. No.: 690,441

[22] Filed: Apr. 23, 1991

Related U.S. Application Data

[63] Continuation-in-part of Ser. No. 559,337, Oct. 17, 1990, and a continuation-in-part of Ser. No. 450,143, Dec. 11, 1989, Pat. No. 5,038,079.

[51] Int. Cl.$^5$ .................................. H05B 37/02
[52] U.S. Cl. .................................... 315/307; 315/156; 315/158; 315/291
[58] Field of Search ............... 315/307, 291, 153, 155, 315/156, 158; 340/541, 566, 600; 250/221

[56] References Cited

U.S. PATENT DOCUMENTS

| | | | |
|---|---|---|---|
| 4,190,795 | 2/1980 | Schultheis | 315/158 X |
| 4,347,461 | 8/1982 | Carlson | 315/158 |
| 4,417,179 | 11/1983 | Fujimura et al. | 315/156 X |
| 4,464,606 | 8/1984 | Kane | 315/158 |
| 4,587,459 | 5/1986 | Blake | 315/158 |
| 4,843,283 | 6/1989 | Chen | 315/153 |
| 4,864,278 | 9/1989 | Wiley | 340/555 |
| 4,943,712 | 7/1990 | Wilder | 250/221 |

Primary Examiner—Eugene R. Laroche
Assistant Examiner—Son Dinh
Attorney, Agent, or Firm—Edward Blocker

[57] ABSTRACT

A fluorescent lamp lighting arrangement controlled by both a motion detector and a light sensing detector operable when said motion detector senses motion.

26 Claims, 10 Drawing Sheets

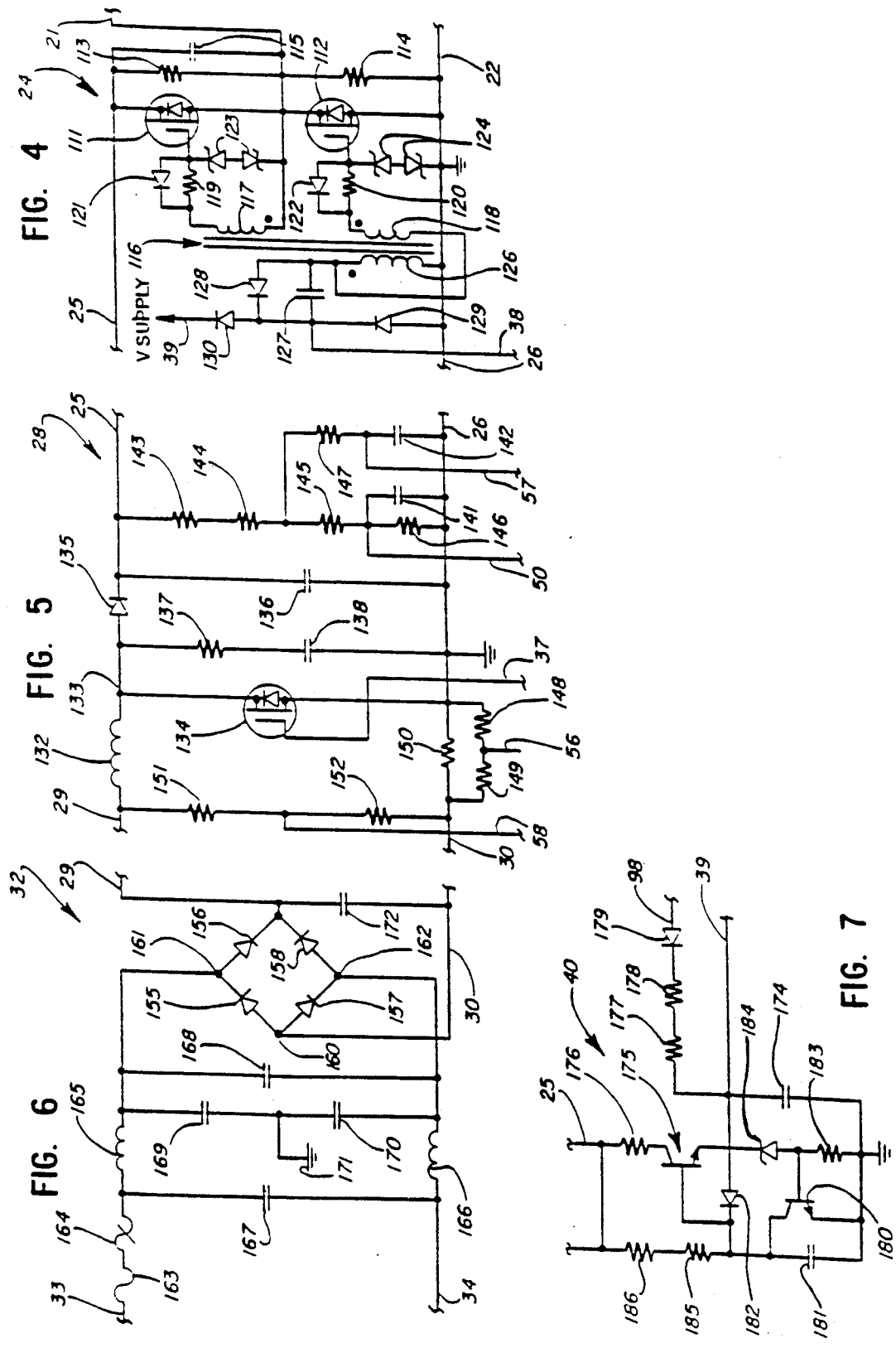

FLUORESCENT LAMP LIGHTING ARRANGEMENT FOR "SMART" BUILDINGS

CROSS-REFERENCE TO RELATED APPLICATIONS

This application is a continuation-in-part of U.S. patent application Ser. No. 07/559,337, filed Oct. 17, 1990, currently pending, and U.S. patent application Ser. No. 07/450,143, filed Dec. 11, 1989, which has issued as U.S. Pat. No. 5,038,079 on Aug. 6, 1991.

BACKGROUND OF THE INVENTION

This is an invention in the lighting art. More particularly, it involves a fluorescent lamp lighting arrangement with an integral motion detector and light sensing detector for controlling the light intensity of fluorescent lamps.

This invention is related to that disclosed in U.S. patent application Ser. No. 599,337 of Stefan F. Szuba filed on Oct. 17, 1990 under the title "A Fluorescent Lamp Arrangement with an Integral Motion Sensor" and U.S. patent application Ser. No. 450,143 of Stefan F. Szuba filed Dec. 11, 1989 under the title "Method for Controlling Fluorescent Lamp Dimmers and Circuit For Providing Such Control" both of which are assigned to the same assignee as this application. Application Ser. Nos. 599,337 and 450,143 and all matter incorporated by reference therein is hereby incorporated by reference herein.

SUMMARY OF THE INEVNTION

One of the objects of this invention is to conserve energy.

One of the advantages of the invention is that it increases the life of fluorescent lamps operated under its control.

One of the features of the invention is that it is useful in so-called "smart" buildings. In this respect, it will dim fluorescent lamps under its control in areas in which no activity is sensed and will vary the amount of artificial light in such areas in accordance with how much natural light strikes such areas.

In accordance with one aspect of the invention, there is provided a fluorescent lamp lighting arrangement including a fluorescent lamp and lamp controller means for controlling the light intensity of the lamp. A control signal means is also included which responds to a predetermined stimulus and produces a control signal when the stimulus occurs. Operating means are provided to respond to the control signal to cause the controller means to change the light intensity of the fluorescent lamp. The operating means includes first and second stages. The first stage includes amplifier means for amplifying the control signals. The second stage includes a voltage regulating means for regulating a first operating voltage applied to the amplifier means for its operation. The voltage regulating means receives a second operating voltage for its operation from the lamp controller means. The amplifier means includes a comparator circuit means operating to render the lamp controller means insensitive to signals from said control signal means less than a predetermined magnitude. The comparator circuit means includes a pair of matched transistors.

In accordance with another aspect of the invention there is provided a fluorescent lamp lighting arrangement including a fluorescent lamp and lamp controller means for controlling the light intensity of the lamp. A control signal means is also included which responds to a predetermined stimulus and produces a control signal when the stimulus occurs. Operating means are provided to respond to the control signal to cause the controller means to change the light intensity of the lamp. The operating means includes a light control circuit which responds to the control signal and operates to control the amount of light provided by the fluorescent lamp at a prescribed location in accordance with a predetermined curve. The light control circuit includes light sensing means sensing the amount of illumination at the prescribed location provided by natural light and by the fluorescent lamp. The predetermined curve has a steep slope when the light sensing means indicates the fluorescent lamp should provide a high amount of light and a more moderate slope when the light sensing means indicates the fluorescent lamp should provide a lesser amount than the high amount. The light control circuit includes determination means for determining at what amount of light from the fluorescent lamp the curve is transposed from the steep slope to the more moderate slope.

In accordance with a still further aspect of the invention, there is provided a fluorescent lamp lighting arrangement including a fluorescent lamp and lamp controller means for controlling the light intensity of the lamp. A control signal means is also included which responds to a predetermined stimulus and produces a control signal when the stimulus occurs. Operating means are provided to respond to the control signal to cause the controller means to change the light intensity of the lamp. The operating means includes first and second stages. The first stage includes amplifier means for amplifying the control signal. The second stage includes a voltage regulating means for regulating a first operating voltage applied to the amplifier means for its operation. The voltage regulating means receives a second operating voltage for its operation from the lamp controller means. The operating means includes a light control circuit which responds to the control signal and operates to control the amount of light provided by the fluorescent lamp at a prescribed location. The light control circuit includes light sensing means sensing the amount of illumination at the prescribed location provided by natural light and by the fluorescent lamp. The light control circuit includes determination means for determining what amount of light is to be provided by the fluorescent lamp.

Other objects, features and advantages of the invention will be apparent from the following description and appended claims. The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a further understanding of the invention reference is had to the following description taken in connection with the accompanying drawing in which:

FIG. 4 is a circuit diagram of a DC-AC converter circuit of the arrangement of FIG. 1;

FIG. 5 is a circuit diagram of a pre-condition circuit of the arrangement of FIG. 1;

FIG. 6 is a circuit diagram of an input rectifier circuit of the arrangement of FIG. 1;

FIG. 7 is a circuit diagram of a voltage supply circuit of the arrangement of FIG. 1;

DETAILED DESCRIPTION OF THE PREFERRED EMBODIMENTS

Figure 1:
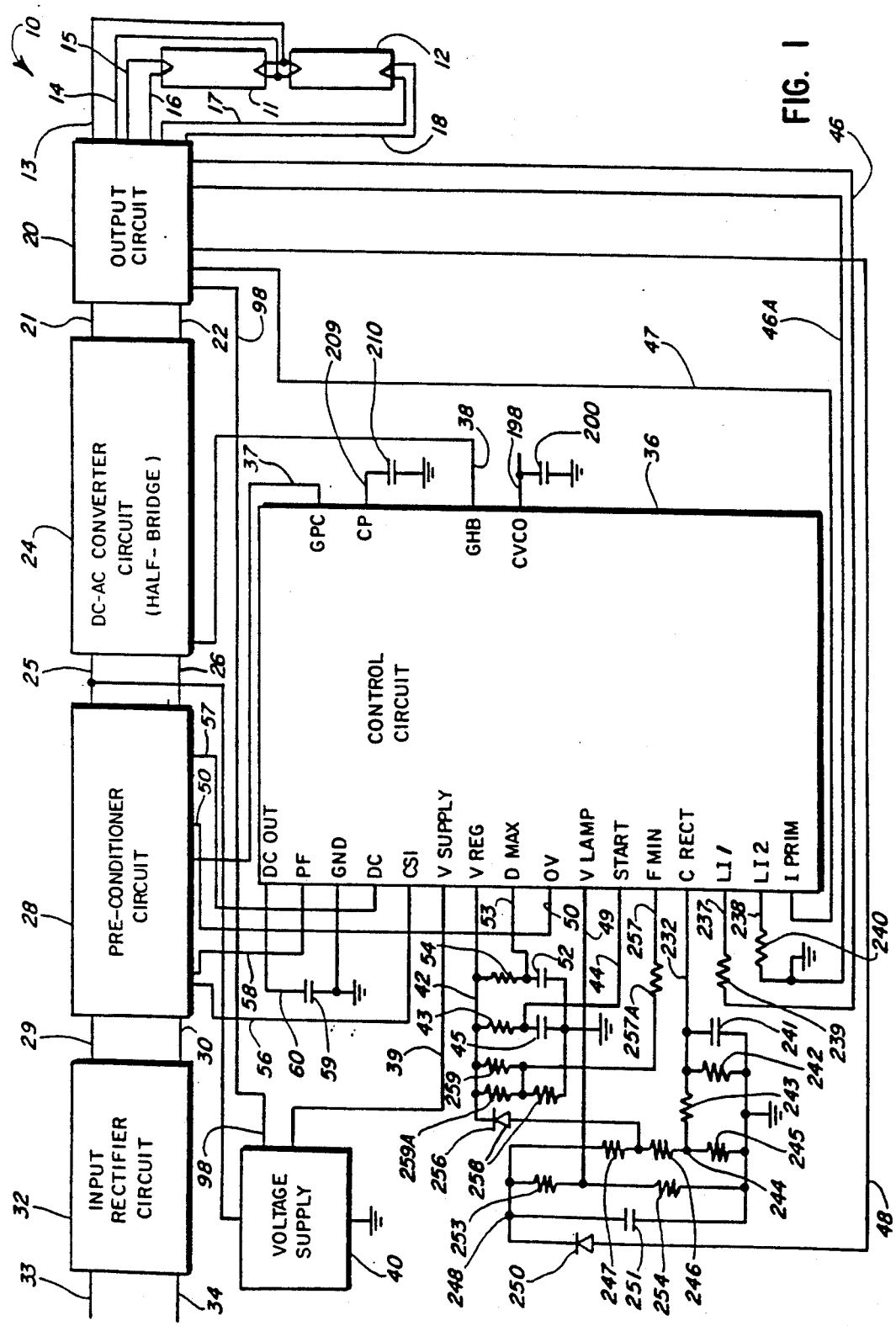
FIG. 1 is a schematic block diagram illustrating a fluorescent lamp controller arrangement which is constructed in accordance with the invention.

Referring to FIG. 1, reference numeral 10 generally designates a fluorescent lamp controller. As shown in FIG. 1, two lamps 11 and 12 are connectable through wires 13–18 to an output circuit 20, wires 13 and 14 being connected to one filament electrode of lamp 11 and one filament electrode of lamp 12, wires 15 and 16 being connected to the other filament electrode of lamp 11 and wires 17 and 18 being connected to the other filament electrode of lamp 12.

Output circuit 20 is connected through lines 21 and 22 to the AC output of a DC-AC converter circuit 24 which is connected through lines 25 and 26 to the output of a pre-conditioner circuit 28. Circuit 28 is connected through lines 29 and 30 to the output of input rectifier circuit 32 which is connected through lines 33 and 34 to a 50 or 60 Hz, 120 volt RMS source of voltage. In the operation of the illustrated embodiment, the pre-conditioner circuit 28 responds to a full-wave rectified 50 or 60 Hz voltage having a peak value of 170 volts, developed at the output of circuit 32 to supply to the DC-AC converter circuit 24 a DC voltage having an average magnitude of about 245 volts.

The DC-AC converter circuit 24 converts the DC voltage from the pre-conditioner circuit 28 to a square wave AC voltage which is applied to the output circuit 20 and which has a frequency in a range of from about 25 to 50 KHz. It will be understood that values of voltages, currents, frequencies and other variables, and also the values and types of various components, are given by way of illustrative example to facilitate understanding of the invention, and are not to be construed as limitations.

Both the pre-conditioner circuit 28 and the DC-AC converter circuit 24 comprise switch mode power processing circuitry and they are controlled by a control circuit 36 which responds to various signals developed by the output circuit 20 and the pre-conditioner circuit 28. In the illustrated controller 10, the pre-conditioner circuit 28 is a variable duty cycle up-converter and is supplied with a pulse-width modulated gating signal "GPC" which is applied through line 37 from the control circuit 36. The DC-AC converter circuit 24 is a half-bridge converter circuit in the illustrated controller 10 and is supplied with a square wave gating signal "GHB" which is applied through a line 38 from the control circuit 36. In accordance with an important feature of the invention, such gating signals are synchronized and may be phase shifted to avoid interference problems and to obtain highly reliable operation. In the illustrated preferred embodiment, they are developed at the same frequency.

Figure 8:
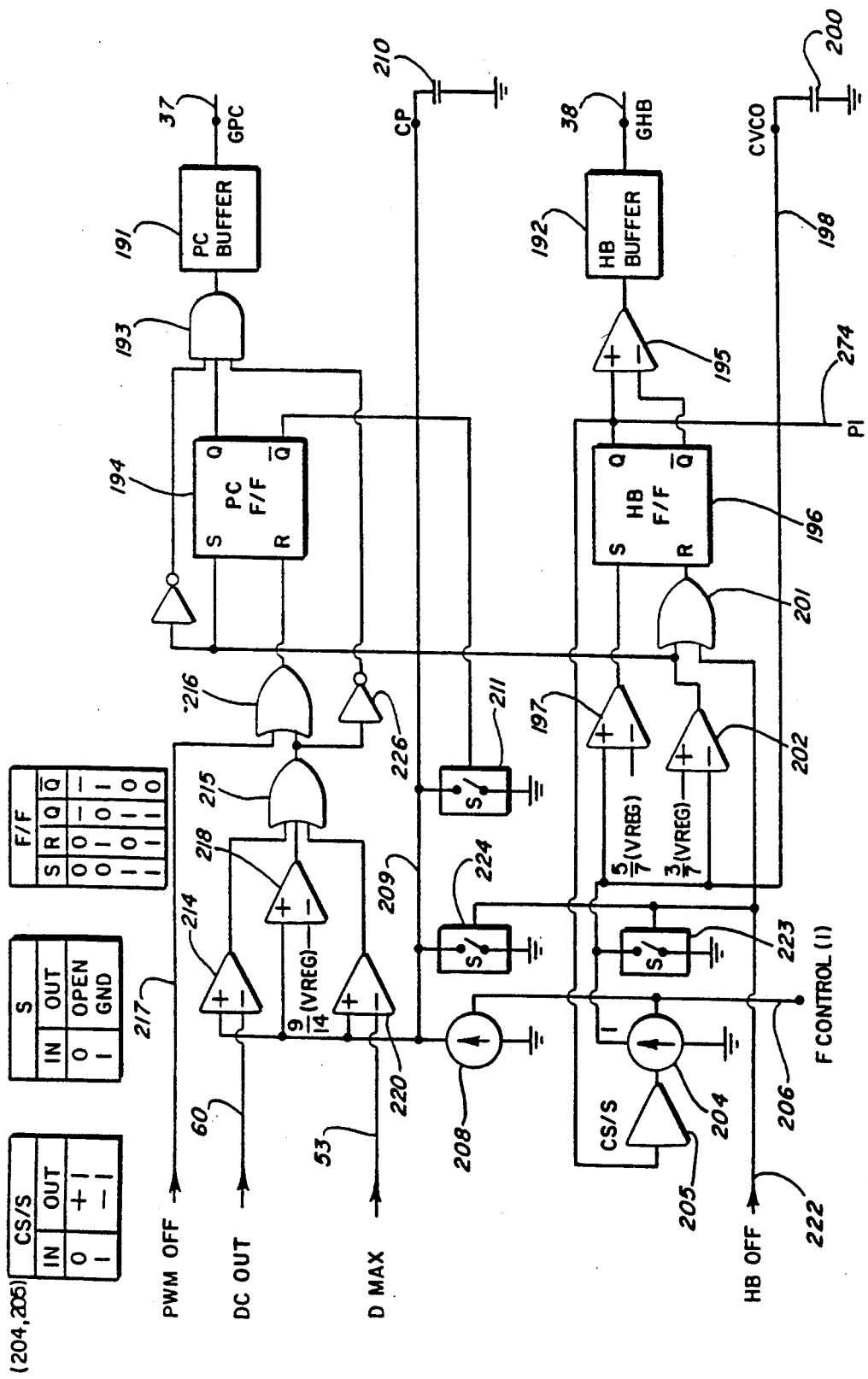
FIG. 8 is a schematic diagram of a portion of logic and analog circuitry incorporated in a control circuit of the arrangement of FIG. 1 and operative for generating high frequency square wave and pulse width modulating gating signals.
Figure 9:
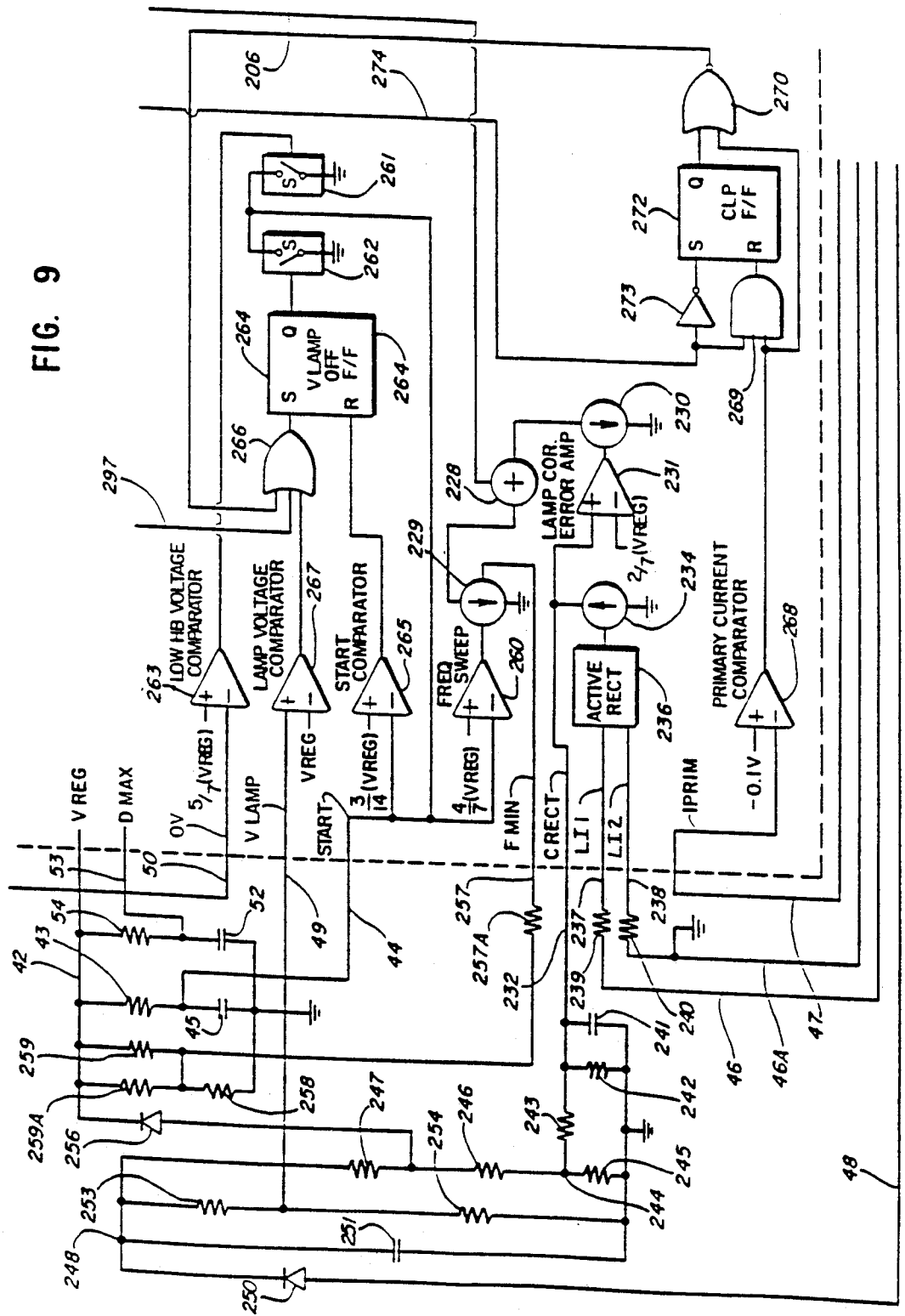
FIG. 9 is a schematic diagram of another portion of logic and analog circuitry incorporated in a control circuit of the arrangement of FIG. 1 and operative for developing a frequency control signal.
Figure 10:
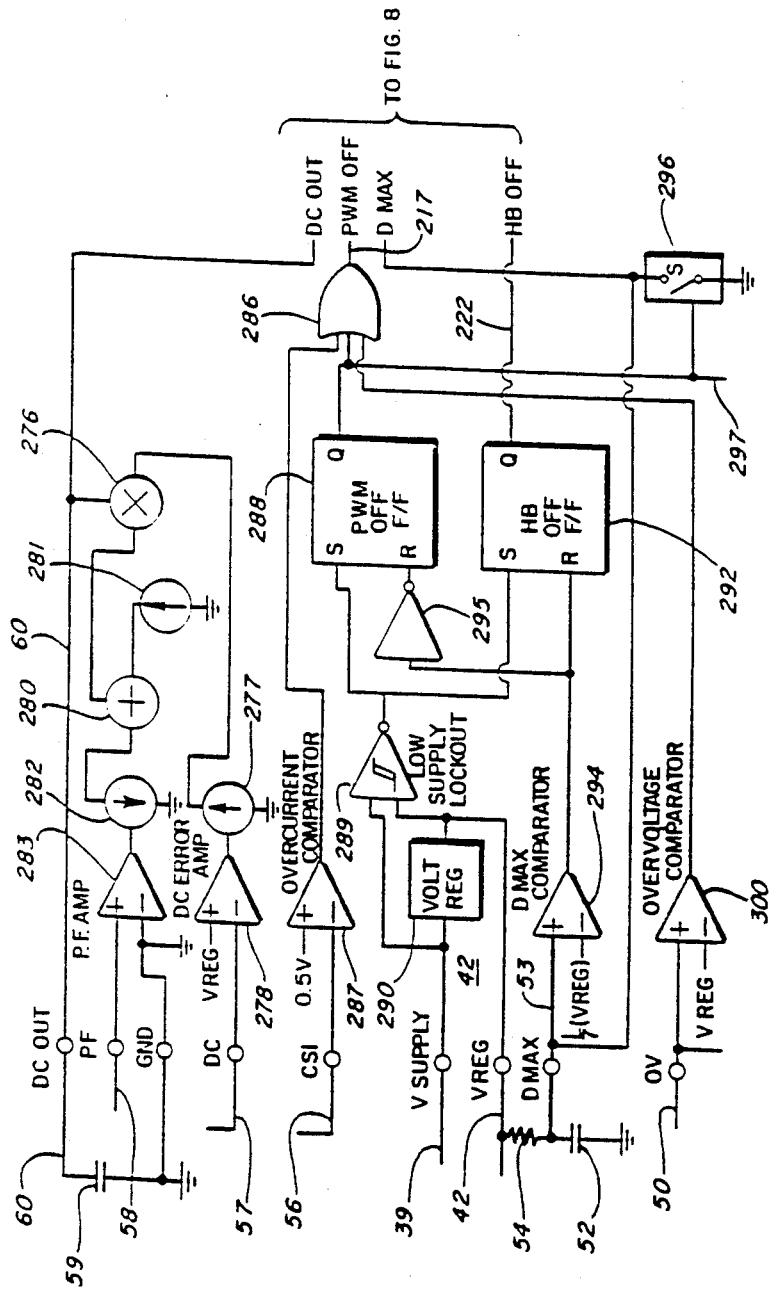
FIG. 10 is a schematic diagram of a third portion of logic and analog circuitry incorporated in a control circuit of the arrangement of FIG. 1 and operative for developing various control signals.

The control circuit 36 is an integrated circuit in the illustrated embodiment and it includes logic and analog circuitry which is shown in FIGS. 8, 9 and 10 and which is arranged to respond to various signals applied from the pre-conditioner and output circuits 28 and 20 to develop and control the "GPC" and "GHB" signals on lines 37 and 38. Certain external components and interface circuitry which are shown in FIG. 1 are also shown in FIG. 9 and are described hereinafter in connection with FIG. 9.

Upon initial energization of the controller and during operation thereof, an operating voltage is supplied to the control circuit 36 through a "V SUPPLY" line 39 from a voltage supply 40. A voltage regulator circuit within the control circuit 36 then develops a regulated voltage on a "V REG" line 42 which is connected to various circuits as shown.

As shown, the "V REG" line 42 is connected through a resistor 43 to a "START" line 44 which is connected through a capacitor 45 to circuit ground. Following energization of the controller 10, a voltage is developed on the "START" line 44 which increases as a exponential function of time and which is used for control of starting operations as hereinafter described in detail. In a typical operation, there is a pre-heat phase in which high frequency currents are applied to the filament electrodes of the lamps 11 and 12 without applying lamp voltages of sufficient magnitude to ignite the lamps. The pre-heat phase is followed by an ignition phase in which the lamp voltages are increased gradually toward a high value until the lamps ignite, the lamp voltages being then dropped in response to the increased load which results from conduction of the lamps.

Important features relate to the control of lamp voltages through control of the frequency of operation, using components in the output circuit 20 to obtain resonance and using a range of operating frequencies which is offset from resonance. In the illustrated embodiment, the operating range is above resonance and a voltage is developed which increases as the frequency is decreased. For example, during the pre-heat phase, the frequency may be on the order of 50 KHz and, in the ignition phase, may then be gradually reduced toward a resonant frequency of 36 KHz, ignition being ordinarily obtained before the frequency is reduced to below 40 KHz.

Upon ignition and as a result of current flow through the lamps, the resonant frequency is reduced from a higher no-load resonant frequency of 36 KHz to a lower load-condition resonant frequency close to 20 KHz. The operating frequency is in a relatively narrow range around 30 KHz, above the load-condition resonant frequency. It is controlled in response to a lamp current signal which is developed within the output circuit 20 and which is applied to the control circuit 36 through current sense lines 46 and 46A, the line 46A being a ground reference line. When the lamp current is decreased in response to changes in operating conditions, the frequency is reduced toward the lower load-condition resonant frequency to increase the output voltage and oppose the decrease in lamp current. Similarly, the frequency is increased in response to an increase in lamp current to decrease the output voltage and oppose the increase in lamp current.

As hereinafter described, the use of an operating frequency which is above the load-condition resonant frequency has an important advantage in providing a capacitive load protection feature, operative to protect against a capacitive load condition which might cause destructive failure of transistors in the DC-AC converter circuit 24. Additional protection is obtained through the provision of circuitry within the output circuit 20 which develops a signal on a "I PRIM" line 47 which corresponds to the current in a primary winding of a transformer of the circuit 20 and which is applied to the control circuit 36. When the phase of the signal on line 47 is changed beyond a safe condition, circuitry within the circuit 36 operates to increase the frequency of gating signals on the "GHB" line 38, to a safe value, to provide additional protection for transistors of the DC-AC converter circuit 24.

During the pre-heat and ignition phases of operation, and also in response to lamp removal, a lamp voltage regulator circuit limits the maximum open circuit voltage across the lamps, operating in response to a signal applied through a voltage sense line 48 and to a "V LAMP" input line or terminal 49 of the control circuit 36, through interface circuitry which is shown in FIG. 1 and also in FIG. 9 and which is described hereinafter in connection with FIG. 9. The lamp voltage regulator circuit operates to effect a re-ignition operation in which the operating frequency is rapidly switched to its maximum value and then gradually reduced from its maximum value to increase the operating voltage, to thereby make another attempt at ignition of the lamps.

The lamp ignition and re-ignition operation is also affected in response to a drop in the output voltage of the pre-conditioner circuit 28 below a certain value, through a comparator within circuit 36 which is connected through an "OV" line 50 to a voltage-divider circuit within. The the voltage on the "OV" line 50 being proportional to the output voltage of the pre-conditioner circuit 28 prevents operation at a low pre-conditioner voltage.

The designation of line 50 as an "OV" line has reference to its connection to another comparator within circuit 36 which responds to an over voltage on the line 50 to shut down operation of the pre-conditioner circuit 28.

Another important protective feature of the controller relates to the provision of low supply lock-out protection circuitry, operative to compare the voltage on the "V SUPPLY" line 39 with the "V REG" voltage on line 42 and to prevent operation of the pre-conditioner circuit 28 and the DC-AC converter circuit 24 until after the voltage on line 39 rises above an upper trip-point. After circuits 28 and 24 are operative, the same circuitry operates to disable the circuits 28 and 24 when the voltage on line 39 drops below a lower trip-point. Then the DC-AC converter circuit 24 is not allowed to be enabled until after the voltage on line 39 exceeds the upper trip point and a minimum time delay has been exceeded. The required time delay is determined by the values of a capacitor 52 which is connected between a "D MAX" line 53 and ground and a resistor 54 connected between line 53 and the "V REG" line 42.

Another feature of the controller 10 relates to the provision of an over-current comparator within circuit 36 which is connected through a "CS1" line 56 to the pre-conditioner circuit 28 and which operates to disable application of gating signals from the "GPC" line 37 to the pre-conditioner circuit 28 when the current to the circuit 28 exceeds a certain value.

Additional features relate to the control of the duration of the gating signals applied from the "GPC" line 37 to the pre-conditioner circuit 28 to maintain the output voltage of the pre-conditioner circuit 28 at a substantially constant average value while also controlling the durations of the gating signals in a manner such as to minimize harmonic components in the input current and to obtain what may be characterized as power factor control. In implementing such operations, the control circuit 36 is supplied with a DC voltage on a "DC" line 57 which is proportional to the average value of the output voltage of the pre-conditioner circuit 28. Circuit 36 is also supplied with a voltage on a "PF" line 58 which is proportional to the instantaneous value of the input voltage to the pre-conditioner circuit 28. An external capacitor 59 is connected to the circuit 36 through a "DC OUT" line 60 and its value has an advantageous effect on the timing of the gating signals. It is also important for loop compensation of the pre-conditioner control circuit 28.

Figure 2:
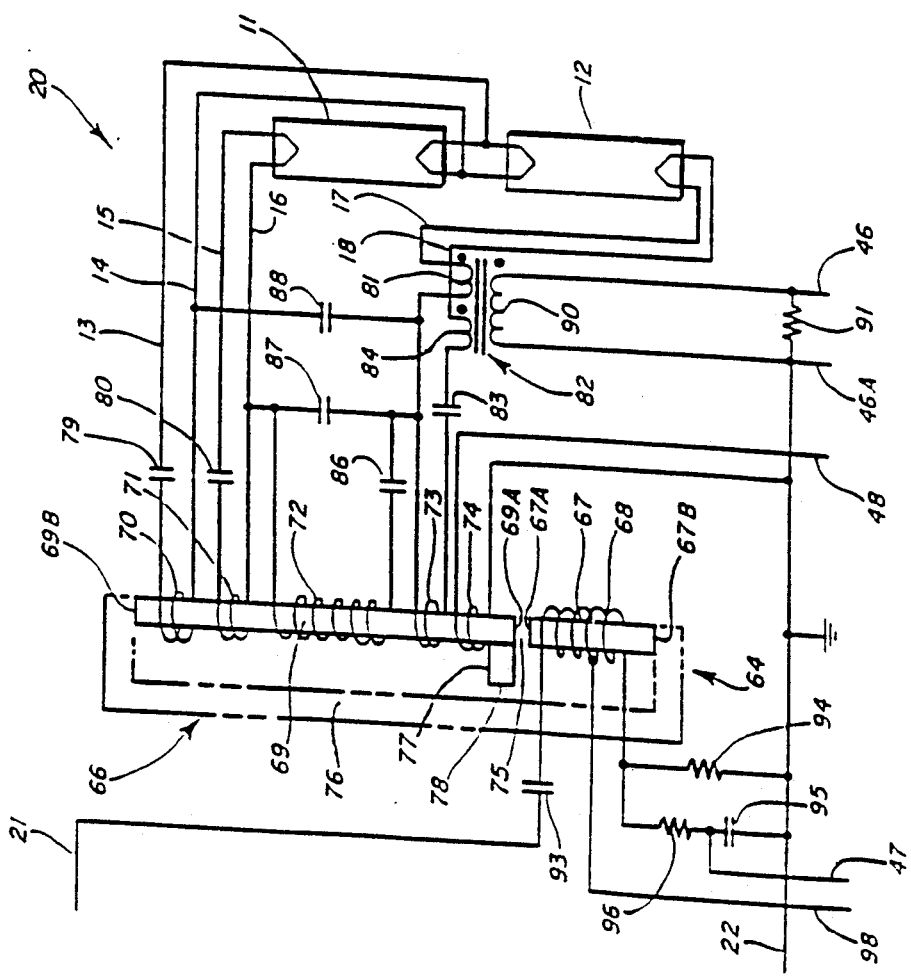
FIG. 2 is a circuit diagram of an output circuit of the lamp arrangement of FIG. 1.

Output Circuit 20 (FIG. 2)

As shown in FIG. 2, the output circuit 20 comprises a transformer 64 which is preferably constructed in accordance with the teachings in the Stupp et al U.S. Pat. No. 4,453,109, the disclosure thereof being incorporated by reference. As diagrammatically illustrated, the transformer 64 comprises a core structure 66 of magnetic material which includes a section 67 on which a primary winding 68 is wound and a section 69 on which secondary windings 70–74 are wound, sections 67 and 69 having ends 67A and 69A adjacent to each other but separated by an air gap 75 and having opposite ends 67B and 69B interconnected by a low-reluctance section 76 of the core structure 66. In addition, although not used in a preferred embodiment, the core structure may optionally include a section 77 as illustrated, extending from the end 69A of the section 69 to a point which is separated by air gap 78 from an intermediate point of the section 77. After ignition, a relatively high current flowing in the secondary windings 70–74 produces a condition in which the resonant frequency is reduced and the "Q" is also reduced.

Secondary windings 70, 71 and 73 are filament windings coupled to the heater electrodes through capacitors which protect against shorting of filament wires. Winding 72 is the lamp voltage supply winding and winding 74 supplies the lamp voltage signal on line 48. As shown, one end of winding 70 is connected through a capacitor 79 to the wire 13, the other end being directly connected to wire 14. One end of winding 71 is connected through a capacitor 80 to the wire 15 while the other end is directly connected to the wire 16. One end of winding 73 is connected to the wire 17 through a primary winding 81 of a current transformer 82 while the other end of winding 73 is connected to the wire 18 through a capacitor 83 and through a second primary winding 84 of current transformer 82. One end of winding 72 is connected to wire 16 while the opposite end thereof is connected through a capacitor 86 to a junction point which is connected through a capacitor 87 to the wire 16, through a capacitor 88 to the wire 14 and through the winding 81 to the wire 17. The current transformer 82 has a secondary winding 90 which is connected in parallel with a resistor 91 and to the current sense lines 46 and 46A.

One end of the primary winding 68 is connected through a coupling capacitor 93 to the input line 21 while the other end thereof is connected through a current sense resistor 94 to the other input line 22 which is connected to circuit ground. Coupling capacitor 93 operates to remove the DC component of a square wave voltage which is applied from the DC-AC converter circuit 24. The "I PRIM" line 47 is connected through a capacitor 95 to ground and through a resistor 96 to the ungrounded end of the current sense resistor 94. A tap on the primary winding 68 is connected through a line 98 to the voltage supply 40, to supply a square wave voltage of about ±20 volts for operation of the voltage supply 40 after a start operation as hereinafter described.

The output circuit operates as a resonant circuit, having a frequency determined by the effective leakage inductance and the secondary winding inductance and the value of capacitor 87 which operates as a resonant capacitor. Capacitor 87 is connected across the series combination of the two lamps 11 and 12 and is also connected across the secondary winding 72 through the capacitor 86 which has a capacitance which is relatively high as compared to that of the resonant capacitor B7 and which operates as a anti-rectification capacitor. Capacitor 88 is a bypass capacitor to aid in starting the lamps and has a relatively low value.

Figure 3:
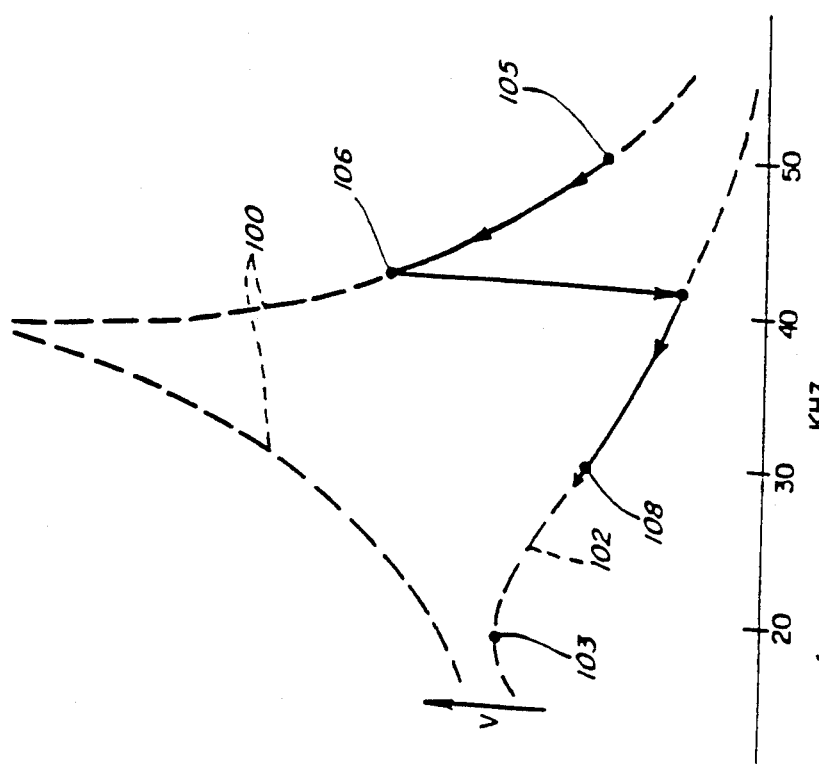
FIG. 3 is a graph illustrating characteristics of the output circuit and its mode of operation.

The graph of FIG. 3 shows the general type of operation obtained with an output circuit 20 such as illustrated. Dashed line 100 indicates a no-load response curve, showing the voltage which might theoretically be produced across the secondary winding 72 with frequency varied over a range of from 10 to 60 KHz, and without lamps in the circuit. As shown, the resonant frequency in the no-load condition is about 36 KHz and if the circuit were operated at that frequency, an extremely high primary current would be produced which might produce thermal breakdowns of transistors and other components. At a frequency of about 40 KHz, a relatively high voltage is produced, usually more than sufficient for lamp ignition. Dashed line 102 indicates the voltage which would be produced across the secondary winding 72 in a loaded condition, with a load which is electrically equivalent to that provided with lamps in the circuit. The resonant frequency at the loaded condition is a substantially lower frequency, close to 20 KHz as illustrated. The resonant peak in the loaded condition is also of broader form and of substantially lower magnitude due to the resistance of the load. It should be understood that resonant peaks are shown for explanatory purposes and that the operating range is offset from resonance.

Actual operation is indicated by a solid line in FIG. 3. Initially, the frequency of operation is at a relatively high value, at about 50 KHz as illustrated and as indicated by point 105. At this point, the voltage across the lamps is insufficient for ignition, but a relatively high voltage is developed across the heater windings 70, 71 and 73. During the pre-heat phase, the frequency is maintained at or near the point 105. Then a pre-ignition phase is initiated in which the frequency is gradually reduced toward the no-load resonant frequency of 36 KHz, following the no-load response curve 100. The lamps 11 and 12 will ordinarily ignite at or before reaching a point 106 at which the frequency is about 40 KHz and the voltage is about 600 volts.

After ignition, the effective load resistance is decreased, shifting the operation to the load condition curve 102. In response to load current after ignition, the frequency of operation is rapidly lowered to a point 108 which is at a frequency of about 30 KHz, substantially greater than the loaded condition resonant peak 103. Operation is then continued within a relatively narrow range in the neighborhood of the point 108, being shifted in response to operating conditions to maintain the lamp current at a substantially constant average value.

DC-AC Converter Circuit 24 (FIG. 4)

The illustrated circuit 24 is in the form of a half-bridge circuit and it comprises a pair of MOSFETs 111 and 112, MOSFET 111 being connected between input line 25 and the output line 21, and MOSFET 112 being connected between the output line 21 and the output line 22 which is connected to circuit ground, as is also the case with the input line 26. Resistors 113 and 114 are connected in parallel with the MOSFETs 111 and 112 to split the applied voltage during start up and a snubber capacitor 115 is connected in parallel with the MOSFET 111. A level shift transformer 116 is provided for driving the gates of the MOSFETs 111 and 112 and effecting alternate conduction thereof to produce a square-wave output at the output line 21, shifting between zero and a voltage of about 245 volts. The transformer 116 includes a pair of secondary windings 117 and 118 coupled through parallel combinations of resistors 119 and 120 and diodes 121 and 122 to the gates of the MOSFETs 111 and 112, with pairs of protective Zener diodes 123 and 124 being provided, as shown. Resistors 119 and 120 shape the turn-on pulses and diodes 121 and 122 provide fast turn-off. The combination of resistors 119 and 120 and diodes 121 and 122 also operates in conjunction with the gate capacitances of the MOSFETS 111 and 112 to provide turn-on delays and to prevent cross-conduction of the MOSFETS 111 and 112.

The level shift transformer 116 has a primary winding 126 which has one end connected to the grounded input and output lines 26 and 22 and which has an opposite end coupled to the "GHB" line 38 through a level shift and coupling capacitor 127, a diode 128 being connected in parallel with capacitor 127, another diode 129 being connected between line 38 and ground and a third diode 130 being connected between line 38 and the "V SUPPLY" line 39.

Pre-Conditioner Circuit 28 (FIG. 5)

The circuit 28 comprises a choke 132 which is connected between the input line 29 and a circuit point 133 which is connected through a MOSFET 134 to the grounded output line 26. A diode 135 is connected between circuit point 133 and the output line 25 and a capacitor 136 is connected between the output line 25 and ground. In addition, a resistor 137 and a capacitor 138 are connected in series between the circuit point 133 and ground.

A resistance network is provided for developing the voltages which are applied through the aforementioned "OV" and "DC" lines 50 and 57 to the control circuit 36, such lines being connected through capacitors 141 and 142 to ground. Capacitor 141 has a relatively small capacitance so that voltage on "OV" line changes rapidly in response to changes in the output voltage. Capacitor 142 has a relatively large value so that the response is relatively slow, the voltage on the "DC" line being used for maintaining the average output voltage at a substantially constant level in a manner as hereinafter described. The resistance network includes four resistors 143–146 connected in series from line 25 to line 26 and a resistor 147 connected between line 57 and the junction between resistors 144 and 145, the line 50 being connected to the junction between resistors 145 and 146.

To develop the current signal on the "CS1" line 56, it is connected through resistors 148 and 149 to grounded output line 26 and the input line 30 with a resistor 150 being connected between lines 26 and 30. To develop a voltage proportional to input voltage on the "PF" line 58, it is connected through a resistor 151 to line 29 and through a resistor 152 to the line 30.

In operation of the pre-conditioner circuit 28, high frequency gating pulses are applied through the "GPC" line 37 to the gate of the MOSFET 134. During each pulse, current builds up through the choke 132 to store energy therein. At the end of each pulse, a "fly-back" operation takes place in which the stored energy is transferred through the diode 135 to the capacitor 136. As hereinafter described, the widths of the gating pulses applied through the "GPC" line 37 are controlled from the voltage developed on the "FF" line 58 during each half cycle of the full wave rectified 50 or 60 Hz voltage on the "PF" line which is supplied to the pre-conditioner circuit 28 and the widths of the gating pulses are also controlled from the voltage developed on the "DC" line 57. The controls are effected in a manner such that the average value of the input current varies in proportion to the instantaneous value of the input voltage while, at the same time, the output voltage of the pre-conditioner circuit 28 is maintained substantially constant.

The capacitance of the output capacitor 136 is relatively large, such that the product of the capacitance and the effective resistance of the output load is large in relation to the duration of one half cycle of the full wave rectified 50 or 60 Hz voltage supplied to the circuit. The duration of each gating pulse can be varied to vary the average input current flow during the short duration of each complete gating pulse cycle in accordance with the instantaneous value of the input voltage and each pulse results in only a relatively small increase in the output voltage across the large output capacitance. At the same time, the durations of the pulses can also be controlled in a manner such as to control the total energy transferred in response to all of the high frequency gating pulses applied during each complete half cycle of the applied full wave rectified low frequency 50 or 60 Hz voltage and to maintain the voltage across the output capacitor 136 substantially constant and at the desired level.

Input Rectifier Circuit 32 (FIG. 6)

The circuit 32 includes four diodes 155–158 forming a full wave bridge rectifier to provide output terminals 159 and 160 connected to lines 29 and 30 and input terminals 161 and 162 which are connected through a filter network and through protective fuse devices 163 and 164 to the input lines 33 and 34. The filter network includes series choke coils 165 and 166, input and output capacitors 167 and 168 and a pair of capacitors 169 and 170 to an earth ground 171, separate from the aforementioned circuit or reference ground for the various circuits of the controller 10. A capacitor 172 is connected between the output lines 29 and 30 and supplies current during conduction of the MOSFET 134 of the pre-conditioner circuit 28 (FIG. 5). The value of capacitor 172 is such as to provide a time constant which is relatively short as compared to one cycle of the input voltage to the circuit 32, but which is longer than the duration of each high frequency gating pulse cycle.

The input current flow to the bridge rectifier is thus in the form of short high frequency pulses of varying durations. However, the filter network formed by components 165–170 and 172 operates to average the value of each pulse over each complete gating cycle and minimizes the transmission of high frequency components to the input power lines.

Voltage Supply Circuit 40 (FIG. 7)

The voltage supply circuit 40 is arranged to supply a voltage on the "V SUPPLY" line 39 which is obtained along line 25 directly through the pre-conditioner circuit 28 and input rectifier circuit 32 during a start-up operation and which is obtained from the DC-AC converter circuit 24 when it becomes operative after start-up. Line 39 is connected between an output capacitor 174 and ground and is connected to the emitter of a transistor 175 the collector of which is connected through a resistor 176 to the output line 25 of the pre-conditioner circuit 28. When the controller is initially energized, and before the MOSFET 134 is conductive, there is a path for current flow from the output of the input rectifier circuit and through choke 132, diode 135, resistor 176 and transistor 175 to the line 39, such that the required voltage on line 39 can be developed through conduction of the transistor 175. The line 39 is also connected through resistors 177 and 178 and a diode 179 to the line 98 which is connected to a tap of the primary winding 68 of the transformer 64 of the output circuit 20, so that the required voltage on line 39 can be obtained from the output circuit 20 when power is applied thereto.

The voltage at line 39 is regulated by a transistor 180 which has a grounded emitter, a collector connected through a capacitor 181 to ground and through a diode 182 to the line 39 and a base connected through a resistor 183 to ground and through a Zener diode 184 to the line 39. The base of transistor 175 is connected through resistors 185 and 186 to the line 25. When the controller 10 is initially energized, there is a path for current flow from the input bridge rectifier 155-158 (FIG. 6) to the line 25, as aforementioned, the capacitor 181 can be charged through the resistors 185 and 186, and a positive bias may be applied to the base of transistor 175 to render it conductive and develop a voltage on the "V SUPPLY" line 39 for operation of the control circuit 36 and to thereafter effect a power up of the pre-conditioner circuit 28, the DC-AC converter circuit 24 and the output circuit 20, as hereinafter described. Then, through current flow through the diode 179 and resistors 178 and 177 after power up, a voltage is developed on the line 39 which is sufficient to cause current flow through the diode 182 and to reverse-bias the base of transistor 175 to cut off current conduction therethrough.

Control Circuit 36 (FIGS. 8-10)

Circuitry within the control circuit 36 and associated external components and interface circuitry are shown in FIGS. 8, 9 and 10. FIG. 8 shows pulse width modulator and oscillator circuitry for producing the "GPC" and "GHB" gating signals on lines 37 and 38; FIG. 9 shows circuitry for applying variable frequency and control signals to oscillator circuity shown in FIG. 8; and FIG. 10 shows circuity for applying control signals to the pulse width modulator circuitry shown in FIG. 8.

Pulse Width Modulator and Oscillator Circuitry (FIG. 8)

As shown in FIG. 8, the "GPC" and "GHB" lines 37 and 38 are connected to the outputs of "PC" and "HB" buffers 191 and 192 of the control circuit 36. The input of the "PC" buffer 191 is connected to the output of an AND gate 193 which has three inputs including one which is connected to the output of a "PC" flip-flop 194 operative for controlling the generating of pulse width modulated pulses. The input of the "HB" buffer 192 is connected to the output of a comparator 195 having inputs connected to the two outputs of an "HB" flip-flop 196 which is controlled to operate as an oscillator and generate a square-wave signal.

Circuits used for the "HB" oscillator flip-flop 196 are described first since they also control the time at which the "PC" flip-flop 194 is set in each cycle, reset of the "PC" flip-flop 194 being performed by other circuits to control the pulse width. As shown, the set input of the "HB" flip-flop 196 is connected to the output of a comparator 197 which has a plus input connected through a "CVCO" line 198 to an external capacitor 200. The minus input of comparator 197 is connected to a resistance voltage divider, not shown, which supplies a voltage equal to a certain fraction of the regulated voltage "V REG" on line 42, a fraction of 5/7 being indicated in the drawing. The reset input of the "HB" flip-flop 196 is connected to the output of an OR gate 201 which has one input connected to the output of a second comparator 202. The minus input of comparator 202 is connected to the "CVCO" line 198, while the plus input thereof is connected to a voltage divider which supplies a voltage equal to a certain fraction of the "V REG" voltage, less than that applied to the minus input of comparator 197, a fraction of 3/7 being indicated in the drawing.

The "CVCO" line 198 is connected through a current source 204 to ground. Current source 204 is bidirectional and controlled through a stage 205 from the output of the "HB" flip-flop 196 to charge the capacitor 200 at a certain rate when the "HB" flip-flop 196 is reset and discharge the capacitor 200 at the same rate when the "HB" flip-flop 196 is set. The rate of charge and discharge is the same and is maintained at a constant rate which is adjustable under control by a control signal on an "F CONTROL" line 206.

In the operation of the "HB" oscillator circuit as thus far described, the capacitor 200 is charged through the source 204 until the voltage reaches the upper level set by the reference voltage applied to comparator 197 at which time the flip-flop 196 is set to switch the source 204 to a discharge mode. The capacitor 200 is then discharged until the voltage reaches the lower level set by the reference voltage applied to comparator 202 at which time the flip-flop 196 is again reset to initiate another cycle. The frequency is controlled by the charge and discharge rate which is controlled by the control signal on the "F CONTROL" line 206.

In the pulse width modulator circuitry, a current source 208 is provided which is connected between ground and a "CP" line 209 to an external capacitor 210 and which is also controlled by the signal on the "F CONTROL" line 206, current source 208 being operative only in a charge mode. A solid state switch 211 is connected across capacitor 210 and is closed when the flip-flop 194 is reset. When a signal is developed at the output of comparator 202 to reset the "HB" flip-flop 196, it is also applied to the set input of the "PC" flip-flop 194 which then operates to open the switch 211 and to allow charging of the capacitor 210 at the constant rate set by the control signal on the "F CONTROL" line 206.

In normal operation, charging of the capacitor 210 continues until its voltage reaches the level of a signal on a "DC OUT" line 60 which is developed by other circuitry within the circuit 36 as hereinafter described in connection with FIG. 10.

The "DC OUT" signal on line 60 is applied to the minus input of a comparator 214, the plus input of which is connected to the "CP" line 209. The output of the comparator 214 is applied through an OR gate 215 and another OR gate 216 to the reset input of the "PC" flip-flop 194 which operates to close the switch 211 and to discharge the capacitor 210 and place the line 209 at ground potential. The line 209 remains at ground potential until the flip-flop 194 is again set in response to a signal from the output of the comparator 202.

The "PC" flip flop 194 may also be reset in response to any one of three other events or conditions. The second input of the OR gate 216 is connected to a "PWM OFF" line 217 which is connected to other circuitry within the control circuit 36, as described hereinafter in connection with FIG. 10. The second input of the OR gate 215 is connected to the output of a comparator 218 which has a plus input connected to the "CP" line 209 and which has a minus input connected to a resistance voltage divider, not shown, which supplies a voltage equal to a certain fraction of the regulated voltage "V REG" on the line 42, a fraction of 9/14 being indicated in the drawing. If, at any time after the flip flop 194 is set, the voltage on line 209 exceeds the reference voltage applied to the minus input of comparator 218, the flip flop 194 will be reset. Thus, there is an upper limit on the width of the generated pulse.

A third input of the OR gate 215 is connected to the output of a comparator 220 which has a plus input connected to the line 209 and a minus input connected to the aforementioned "D MAX" line 53. The "D MAX"

line 53 is also connected to other circuitry within the control circuit 36 and the operation in connection with the "D MAX" line 53 is described hereinafter.

Provisions are made for disabling both the half bridge oscillator and pulse width modulator circuits in response to a signal on a "HB OFF" line 222 which is connected to solid state switches 223 and 224 operative to connect the "CVCO" and "CP" lines 198 and 209 to ground. Line 222 is also connected to a second input of the OR gate 201 to reset the "HB" flip flop 196. An inverter circuit 225 is connected between the set input of flip flop 194 and an input of the AND gate 193. Another inverter 226 is connected between the output of the OR gate 215 and a third input of the AND gate 193, for the purpose of insuring development of an output from the pulse width modulator circuit only under the appropriate conditions.

Frequency Control Circuitry (FIG. 9)

The frequency control circuitry shown in FIG. 9 is also incorporated within the control circuit 36 and operates to control the level of the frequency control signal ("F CONTROL") on line 206. Line 206 is connected to the output of a summing circuit 228 which has inputs connected to two current sources 229 and 230. The current source 229 is controlled in conjunction with starting operations and "retried" operations made when the lamps fail to ignite in a starting operation. The current source 230 is controlled in response to output lamp current.

In normal operation, after ignition, the current of the current source 229 is constant, changes in frequency being controlled solely by the current source 230. Current source 230 is connected to the output of a lamp current error amplifier 231 which has a minus input supplied with a reference voltage developed by a voltage divider (not shown) within the circuit 36, a reference voltage of 2/7 of the regulated voltage "V REG" being indicated. The plus input of the comparator 231 is connected to a "C RECT" line 232 and is also connected through a current source 234 to ground. Current source 234 is controlled by an active rectifier 236 having inputs which are connected through "LI1" and "LI2" lines 237 and 238 and external resistors 239 and 240 to the current sense lines 46 and 46A. As shown, the current sense line 46A is a ground interconnect line.

The "C RECT" line 232 is connected through an external capacitor 241 and parallel resistor 242 to ground and is also connected through a resistor 243 to a circuit point 244 which is connected through a resistor 245 to ground and through resistors 246 and 247 to a circuit point 248. Circuit point 248 is connected through a diode 250 to the voltage sense line 48, through a capacitor 251 to ground and also through a pair of resistors 253 and 254 to ground. The "V LAMP" line 49 is connected to the junction between resistors 253 and 254. A diode 256 is connected to the junction between resistors 246 and 247 and the "V REG" line 42 to limit the voltage at that junction to the regulated voltage on line 42.

In operation, the active rectifier 236 controls the current source 234 in accordance with the lamp current which is sensed by the current transformer 82 (FIG. 2, lines 46 and 46A). The current source 234, in turn, controls the amplifier 231 to control the current source 230 which operates through the summing circuit 228 and line 206 to control the current source 204 (FIG. 8) and thereby control the frequency of operation.

The "C RECT" line 232 applies a correction signal to adjust the operation in accordance with the type of lamps used, the correction signal being controlled by the lamp voltage and normally being of relatively small magnitude, being essentially zero in some cases. The diode 256 serves to limit the voltage developed at the "C RECT" line during start-up.

To establish a minimum frequency of operation, a control current is applied to the current source 229 through a "F MIN" line 257 which is connected through a resistor 257A to a circuit point which is connected through a resistor 258 to ground and through a pair of resistors 259 and 259A to the "V REG" line 42.

The current source 229 is also controlled by a "frequency sweep" amplifier 260 which has a plus input connected to a reference voltage source, a reference of 4/7 of the regulated voltage on line 42 being shown. The minus input of amplifier 260 is connected to the "START" line 44 and is also connected through two switches 261 and 262 to ground. Switch 261 is controlled by a comparator 263 to be closed when the output voltage of the pre-conditioner circuit 28 is less than a certain threshold value. As shown, a reference voltage of 5/7 of the regulated voltage on line 42 is applied to its plus input and its minus input is connected to the "OV" line 50 (FIG. 5).

The switch 262 is connected to an output of a "VLAMP OFF" flip-flop 264 which has a reset input connected to the output of a "START" comparator 265. The minus input of comparator 265 is connected to the "START" line 44 and the plus input thereof is connected to a reference voltage source, a reference of 3/14 of the regulated voltage on line 42 being indicated. The set input of the flip-flop 264 is connected to the output of an OR gate 266 which has inputs for receiving any one of three signals which can operate to set the "VLAMP OFF" flip-flop and to cause closure of the switch 262.

One input of OR gate 266 is connected to the output of a lamp voltage comparator 267, the minus input of comparator 267 being connected to the "V REG" line 42 and the plus input thereof being connected to the "V LAMP" line 49. When the lamp voltage exceeds a certain value, a signal is applied from the lamp voltage comparator 267 to set the flip-flop 264 and to thereby effect closure of the switch 262 and grounding of the "START" line 44.

A second input of OR gate 266 is connected to be responsive to setting of a flip-flop of pulse width modulator circuitry shown in FIG. 10 and described hereinafter.

A third input of OR gate 266 is connected to be responsive to a signal which is generated by circuitry described hereinafter, to effect operation of the flip-flop 264 when the phase of the signal on the "I PRIM" is beyond a safe value.

In the start operation, the current of the current source 229 has a maximum value and the current of source 230 has a minimum value and the frequency is at a certain maximum value, such as 50 KHz. The voltage applied by the output circuit, once the pre-conditioner and DC-AC converter circuits 28 and 24 are operative, is sufficient for heating the lamp filaments but insufficient for ignition of the lamps. When power is initially supplied to the controller 10, the switch 261 is closed and the switch 262 is open. After the voltage on the "OV" line 50 exceeds 5/7 ("V REG"), the switch 261 is opened by the low HB voltage comparator 263. Then the voltage of the "START" line 44 will start to rise exponentially in response to current flow through the resistor 43.

When the voltage of the "START" line 44 approaches a certain level, determined by the reference voltage applied to the frequency sweep amplifier 260, at around 4/7 ("V REG"), the ignition phase is initiated. At this time, the frequency sweep amplifier 260 starts to decrease the current through the current source 229 to operate through the summing circuit 228 and the line 206 ("F CONTROL") to decrease the frequency of operation. When the frequency is decreased to a certain value, the lamps will ignite, usually at a frequency above 40 KHz. The lamp operation phase is then initiated. At this time, the effective resonant frequency of the output circuit is lowered substantially. At the same time, the current through the lamps is sensed by the current transformer 82 and a control signal is developed by the active rectifier 236 to operate to drop the frequency to a range appropriate for operation of the lamps, at around 30 KHz.

If the lamps should fail to ignite during the ignition phase, the frequency will continue to be lowered and the lamp voltage will continue to increase until voltage on the "V LAMP" line 49 reaches a certain value, at which time the lamp voltage comparator 267 will apply a signal through the OR gate 266 to set the flip-flop 264 and to effect momentary closure of the switch 262 to ground the "START" line 44 and discharge the capacitor 45. The voltage of "START" line 44 is then dropped below a certain value and a reset signal is applied from the start comparator 265 to reset the flip-flop 264. Then the voltage of the "START" line will again start to rise exponentially. When it reaches a certain higher value, the ignition phase is again initiated through operation of the frequency sweep comparator 260 in the manner as above described. Thus one or more "retry" operations are effected, continuing until ignition is obtained, or until energization of the controller is discontinued.

As aforementioned, the flip-flop 264 may also be operated to a set condition when the phase of the signal on the "I PRIM" line changes beyond a safe value. The circuitry shown in FIG. 9 further includes a primary current comparator 268 having a minus input connected to the "I PRIM" line 47 and having a plus input connected to a source of reference voltage, which is not shown but which may supply a reference voltage of −0.1 volts as indicated. The output of the comparator 268 is connected to one input of an AND gate 269 and is also connected to one input of a NOR gate 270. The output of the AND gate 269 is connected to the reset input of a "CLP" flip-flop 272 having an output connected to a second input of the NOR gate 270. The set input of the flip-flop 272 is connected to the output of an inverter 273. The input of the inverter 273 and a second input of the AND gate 269 are connected together through a line 274 to the half bridge oscillator circuitry shown in FIG. 8, being connected to the output of the half bridge flip-flop 196. The output of the NOR gate 270 is connected through the OR gate 266 to the set input of the flip-flop 264.

In operation, the output of the NOR gate 270 is high only when the flip-flop 272 is reset and, at the same time, the output of the primary current comparator 268 is low. Such conditions can take place only when the phase of the current on the line 47 relative to the signal applied on the line 274 is changed in a leading direction beyond a certain threshold angle which is determined by the reference voltage applied to the primary current comparator 268. The signal on line 274 is supplied from the output of the "HB" flip-flop 196 (FIG. 8) which supplies the gating signals to the DC-AC or half bridge converter circuit 24.

Figure 11:
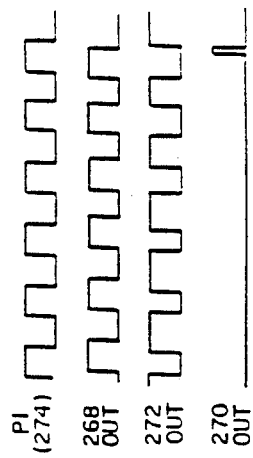
FIG. 11 is a graph illustrating the wave forms produced in phase comparison circuitry shown in FIG. 9, for explanation of the operation thereof.

FIG. 11 is a graph which shows the relationships of the voltages on line 274 and at the outputs of comparator 268, flip-flop 272 and NOR gate 270 as the phase of the signal on the "I PRIM" line is advanced in a leading direction. When the trailing edge of the output of comparator 268 occurs before the leading edge of the output of flip-flop 272, the output of NOR gate 270 goes high and is applied through the OR gate 266 to set the "V LAMP" flip-flop 264, and to cause the frequency sweep in the manner as described above.

The circuitry shown in FIG. 9, including components 268, 269, 270, 272 and 273, is operative in the arrangement as shown for checking only the conduction of one of the MOSFETS of the circuit 24. Normally, it will provide more than adequate protection with respect to the other MOSFET, using the circuitry as shown and described. However, it will be understood that for additional protection or with other types of converter circuits, a phase comparison arrangement as shown may be provided for each MOSFET or other type of transistor of the converter.

Pulse Width Modulator Control Circuitry (FIG. 10)

The voltage on the "DC OUT" line 60, which controls the width of the pulses generated by the pulse width modulator circuit of FIG. 8, is developed at the output of a multiplier circuit 276 which has one input connected to ground through a current source 277 which is controlled by a DC error amplifier 278. The plus input of the amplifier 278 is connected to the voltage regulator line 42 ("V REG") while the minus input thereof is connected to the "DC" line 57 on which a voltage is applied proportional to the output voltage of the pre-conditioner circuit 28. The other input of the multiplier circuit 276 is connected to the output of a summing circuit 280 which is connected to two current sources 281 and 282.

Current source 281 supplies a constant reference or bias current in one direction while current source 282 supplies a current in the opposite direction under control of the voltage on the "PF" line 58. The source 282 is connected to the output of a "PF" amplifier 283 which has a plus input connected to line 58 and a minus input connected to ground. In operation, the input waveform is, in effect, inverted through control of the current source 282 and then added to a reference determined by the current source 281, the waveform being multiplied by a value proportional to the average output of the pre-conditioner circuit 28.

With proper adjustment, a control of the width of each gating pulse is obtained such that the average input current flow during the short duration of each complete gating pulse cycle is proportional to the instantaneous value of the input voltage to the pre-conditioner circuit. At the same time, the pulse widths are controlled through the current source 277 to control the total energy transferred in response to all of the high frequency gating pulses applied during each complete half cycle of the applied full wave rectified low frequency 50 or 60 Hz voltage. The result is that the output voltage of the pre-conditioner circuit 28 is substantially constant while at the same time, the input current waveform is proportional to and in phase with the input voltage waveform, so that the input current waveform is sinusoidal when the input voltage waveform is sinusoidal.

The "PWM OFF" line 217 is connected to the output of an OR gate 286 which has one input connected to the output of an over-current comparator 287. The plus input of comparator 287 is connected to a reference voltage source (not shown) which may supply a voltage of −0.5 volts, as indicated. The minus input of the comparator 287 is connected to the "CSI" line 56. In operation, if the input current to the pre-conditioner circuit 28 should exceed a certain level, the over-current comparator 287 applies a signal to the OR gate 286 to the line 217 and through the OR gate 216 to reset the pre-conditioner flipflop 194 (see FIG. 8).

A second input of the OR gate 286 is connected to an output of a "PWM OFF" flip-flop 288 which has a set input connected to the output of a Schmitt trigger circuit 289 having one input connected to the "V SUPPLY" line 39 and having a second input connected to the voltage regulator line 42. As shown, a voltage regulator 290 is incorporated in the control circuit 36 and is supplied with the voltage on line 39 to develop the regulated voltage on line 42 The output of the Schmitt trigger circuit 289 is also applied to the set input of a flip-flop 292 which is connected to the "HB OFF" line 222. In operation, if the supply voltage should drop below a certain level, both flip-flops 288 and 292 are set to disable the pulse width modulator and oscillator circuits (FIG. 8).

The reset input of the flip-flop 292 is connected to the output of a "D MAX" comparator 294 which has a plus input connected to the "D MAX" line 53, the minus input of the comparator 294 being connected to a source of a reference voltage which may be 1/7 ("V REG") as indicated. The reset input of the flip-flop 288 is connected to the output of an inverter 295 which has an input connected to the output of the comparator 294. The "D MAX" line 53 is also connected through a switch 296 to ground, switch 296 being controlled by the "PWM OFF" flip-flop 288.

It is noted that the output of the flip-flop 288 is also connected through a line 297 to a third input of the OR gate 266 in the frequency control circuitry shown in FIG. 9. An overvoltage comparator 300 has an input connected to the "OV" line 50 and an output connected through the OR gate 286 to the "PWM OFF" line 217.

In the operation of the pulse width modulator control circuitry of FIG. 10, the flip-flops 288 and 292 are, of course, in a reset condition when the controller is initially energized. After a certain time delay, as required for the voltage on the "V SUPPLY" and "V REG" lines 39 and 42 to develop, the Schmitt trigger circuit operates to set both flip-flops 288 and 292 but thereafter, the flip-flop 288 is reset through the inverter 295 from the output of the "D MAX" comparator 294. Then, when the "D MAX" capacitor 52 is charged to a value greater than 1/7 ("V REG"), the "D MAX" comparator operates to reset the "HB OFF" flipflop 292. At this time, operation of the "HB" oscillator flip-flop 196 (FIG. 8) may commence. The operation of the "PC" flip-flop 194 (FIG. 8) may also commence. Initially the width of the "GPC" gate pulses is controlled by the increasing signal on the "D MAX" line 53 so that the output of the pre-conditioner circuit 28 gradually increases and thus, a "soft" start is obtained.

The "D MAX" voltage thus controls a time delay in turning on the oscillator circuitry after initial energization and thereafter controls the width of pulses generated by the pulse width modulator flip-flop 194, so as to obtain the gradually increasing voltage and the "soft" start.

The system of the invention thus provides dynamic controls which automatically respond to variations in operating conditions and in the values or characteristics of components in a manner such as to obtain safe and reliable operation while at the same time achieving optimum performance and efficiency. In connection with the frequency sweep feature, for example, there can be substantial variations in the resonant frequency in the output circuit. The required lamp ignition voltage is approached by gradually lowering the frequency from a high frequency to thereby gradually increase the voltage, the operation being temporarily aborted and a "retry" operation being effected only if the lamp voltage exceeds a safe value. If, by contrast, a fixed frequency were chosen for starting and if the resonant frequency shifted from the design value, the chosen frequency might be either so high as to prevent reliable starting or so low as to produce resonant or near resonant conditions, excessive voltages and breakdowns of transistors or other components.

The dual mode control arrangement, using voltage control for ignition and current control after ignition is also highly advantageous as is also the downward shift in the resonant frequency upon ignition. Any possible problems which might result from lamp removal or failure are avoided through the arrangement which rapidly responds to a change in phase beyond a safe value to shift to a safe operating level, by shifting to a high frequency.

As a result of these and other features, the controller as shown and described herein is adaptable for a variety of uses and is highly versatile. When used to control lamps, the light output can be accurately regulated and controlled and the circuitry may be used in manually or automatically controlled dimming arrangements.

Figure 12:
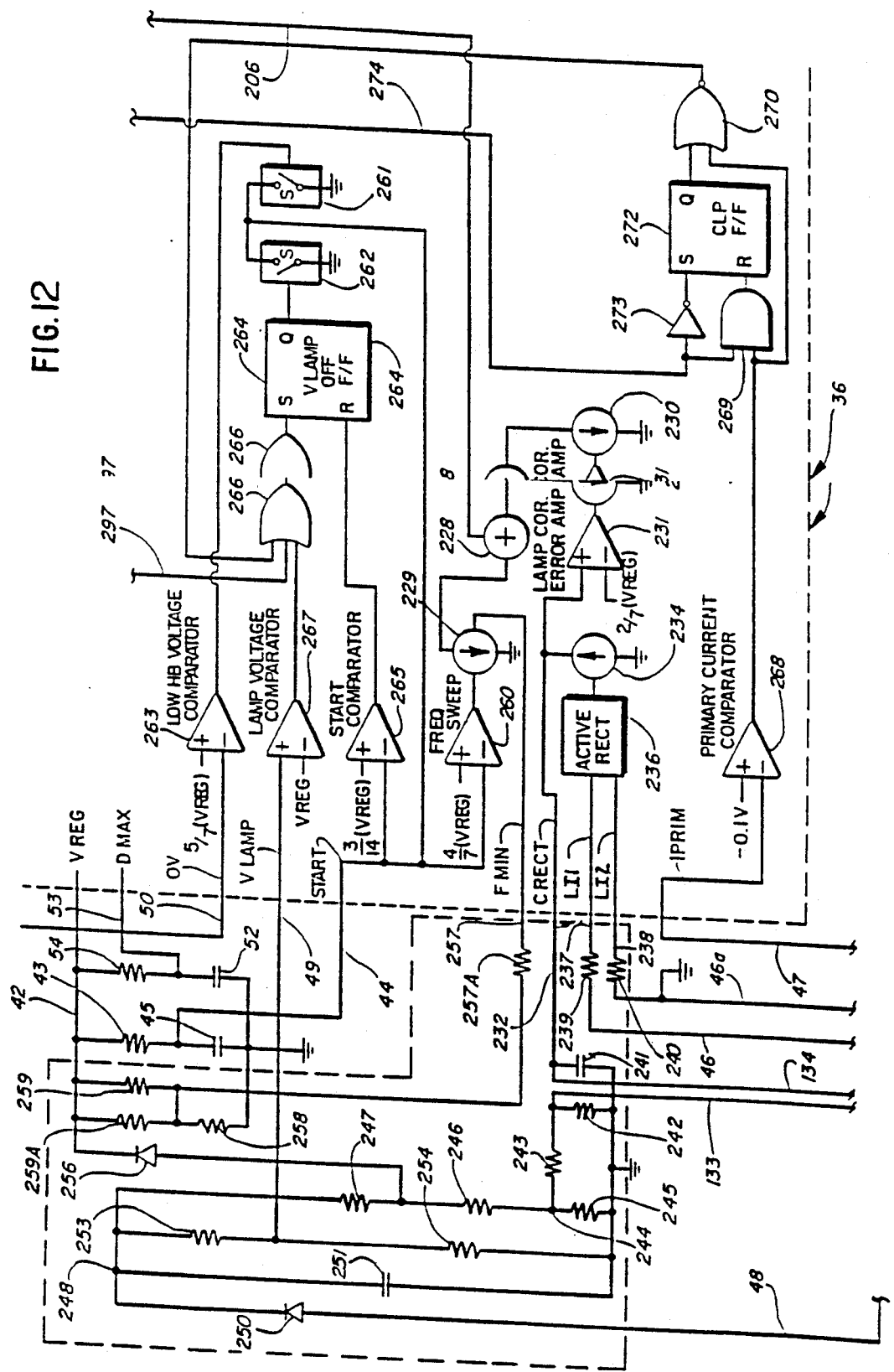
FIG. 12 is a circuit diagram of a modified voltage supply circuit as shown in FIG. 7.
Figure 13:
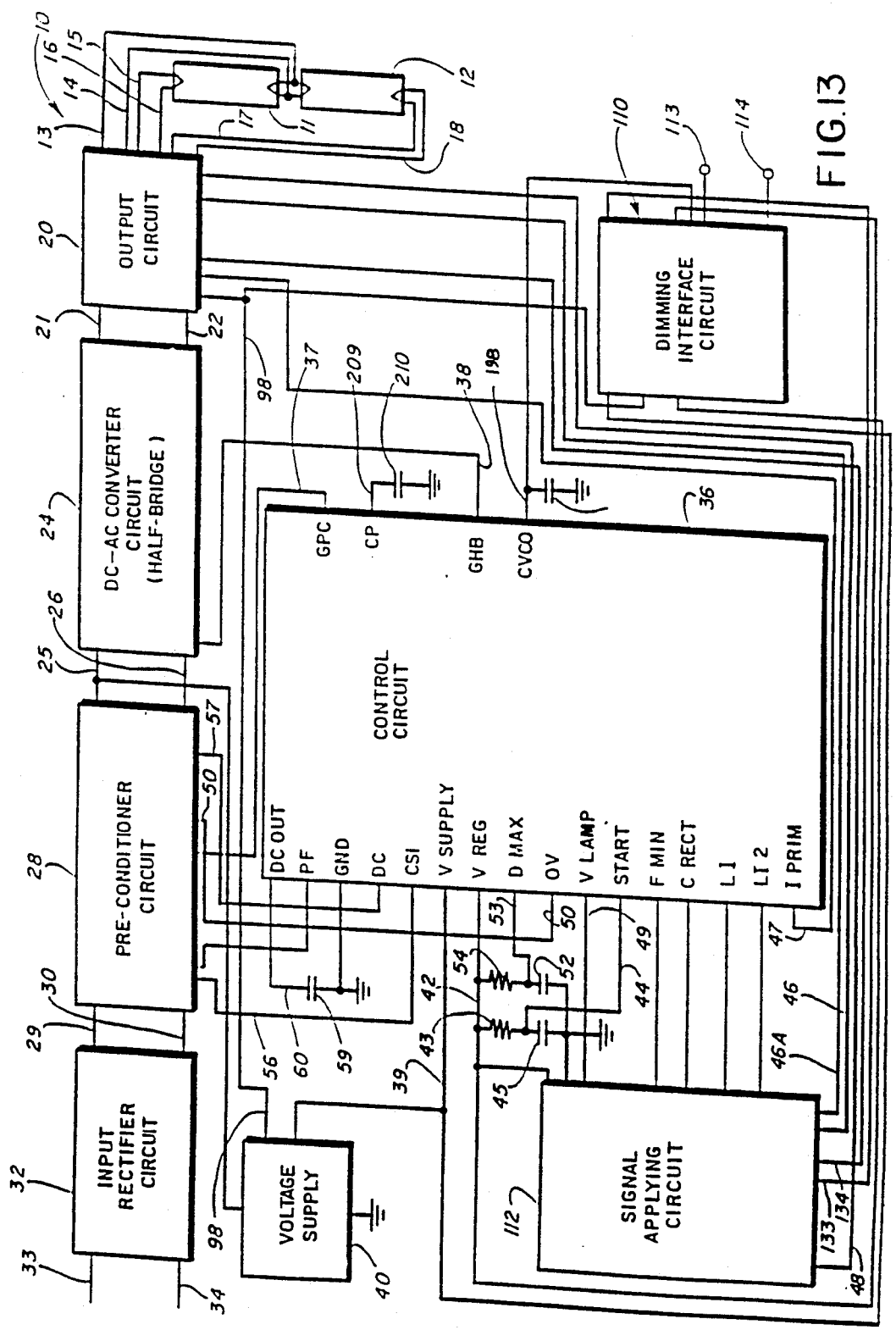
FIG. 13 is a schematic block diagram of the fluorescent lamp controller of FIG. 1 with a dimming interface circuit added.

A particular dimming interface circuit and the manner in which it is interconnected to the previously disclosed fluorescent lamp controller follows. FIG. 12 is a copy of the frequency control and signal applying circuitry shown in FIG. 9 except for the break in line CRECT between the terminals of resistor 242 and capacitor 241 in that line. This break permits the connection through lines 133' and 134' to the output of dimming interface circuit 110' shown in FIG. 13. FIG. 13 is similar to FIG. 1 except that some parts of the signal applying circuitry shown schematically in FIGS. 9 and 12 are shown as a block diagram 112 in FIG. 13 as opposed to the schematic manner in which those circuits are shown in FIGS. 9 and 12. In addition various interconnections are made to the dimming interface circuit 110'. These interconnections include a connection from voltage supply 40 along line 98, a connection along line 39 from the V SUPPLY terminal of control circuit 36, a connection along line 42 from the VREG terminal of control circuit 36, the connections along lines 133' and 134' from the outputs of dimming interface circuit 110 to signal applying circuit 112 and terminals 113'and 114' of dimming interface circuit 110' to be used to connect dimming interface circuit 110' to equipment to be described later.

Figure 14:
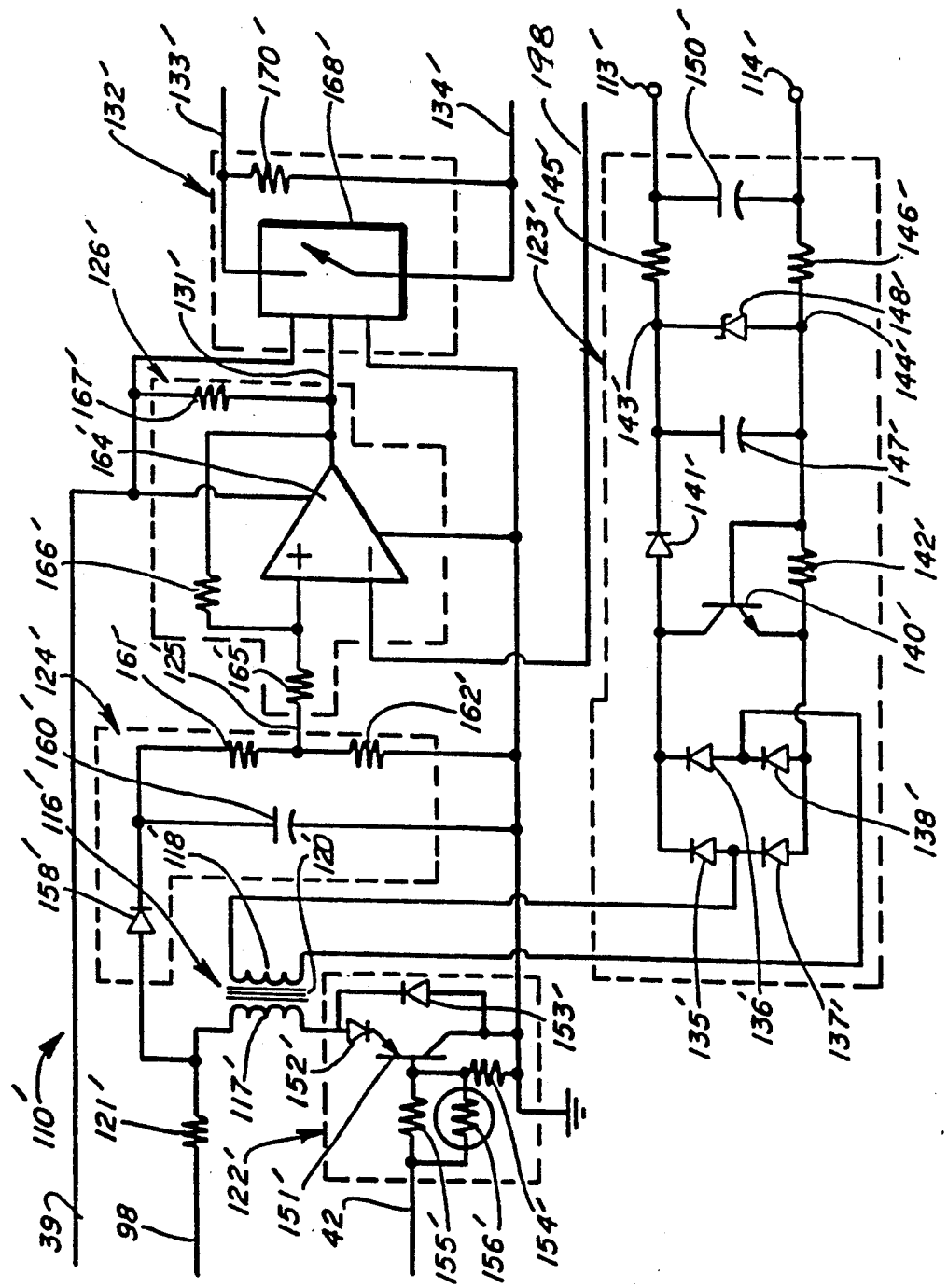
FIG. 14 is a circuit diagram of the dimming interface circuit of FIG. 13.

FIG. 14 illustrates dimming interface circuit 110' in a presently preferred form. As previously mentioned interface circuit 110' is connected to signal applying circuitry 112 of controller 10 to operate it to control the energization of fluorescent lamps 11 and 12. This control takes place in accordance with a low voltage DC control signal applied to input terminals 113' and 114' of interface circuit 110'. Circuit 110' provides high voltage isolation between nongrounded circuits of controller 10 and grounded dimming controls (to be described later) which are connected to the terminals 113' and 114'. Circuit 110' also converts a low voltage DC input control signal produced by the dimming controls to a form which is compatible with the circuitry of controller 10. Circuit 110' is energized from controller 10 so that no separate power supply is required.

Dimmer interface circuit 110' includes a transformer 116' which has primary and secondary windings 117' and 118' on a core 120' of magnetic material. Controller 10 provides a high frequency AC source along line 98 for energization of primary winding 117'. This connection is made through a resistor 121' and line 98 to a tap of primary winding 68 of transformer 64 of output circuit 20 (FIG. 2). The lower end of primary winding 117' is connected to ground through a level shift circuit 122'.

Secondary winding 118' is connected to a clipping circuit 123' which operates to limit or clip the voltage across the secondary winding to a value which is proportional to a voltage applied to input terminals 113' and 114'. This limits the voltage across the secondary winding 118'. The AC voltage across the primary winding 117' is limited to a corresponding value as a result of the tight or high coefficient of coupling between primary and secondary windings 117' and 118'. The resistance of resistor 121' in series with primary winding 117' also limits the value of the voltage applied to that winding.

The controlled AC voltage which is developed across primary winding 117' is applied to a peak detect and scaling circuit 124'. Circuit 124' develops a corresponding DC voltage which is used for controlling the effective value of a resistive load which is connected to signal applying circuit 112 as described hereinafter. By connecting this resistive load to signal applying circuit 112 controller 10 is controlled in a manner which determines the energization of lamps 11 and 12.

The output of peak detector and scaling circuit 124' is connected through a line 125' to one input of comparator circuit 126'. A second input of comparator circuit 126' is connected through a line 198 to terminal CVCO of control circuit 36 (FIG. 13). As has been described, capacitor 200 is charged and discharged at the same rate and thus develops a periodically varying triangular voltage on line 198. Through comparison of the two inputs to comparator circuit 126' a pulse width square wave signal is developed at its output which has a duty cycle controlled by the voltage on input line 125'. This output voltage is applied through an output line 131' to an analog switch circuit 132'. Switch circuit 132' is connected through line 133' and line 134' to signal applying circuit 112 to control operation of the controller 10 in a manner as described later.

Clipping circuit 123' comprising four diodes 135'-138' which form a bridge rectifier circuit having input terminals connected to secondary winding 118'. The output terminals of the bridge circuit are connected to the collector and emitter of transistor 140' and through a diode 141' and resistor 142' to circuit points 143' and 144'. These circuit points are connected through resistors 145' and 146' to input terminals 113' and 114'. The base of transistor 140' is connected to circuit point 144'. A capacitor 147' and a zener diode 148' are connected between circuit points 143' and 144'. A capacitor 150' is connected between lines 113' and 114'. Zener diode 148' limits the voltage between circuit points 143' and 144' to a safe value.

In operation a DC control voltage is applied between the input terminals 113' and 114' as will be described later. Transistor 140' conducts to limit the output voltage of rectifier circuit 135' through 138' to a value which is only slightly greater than the control voltage applied to the input terminals 113' and 114'. Transistor 140' operates as a current amplifier to limit the required sinking current through the control voltage source connected to terminals 113' and 114' to a relatively small value. A control current flows from whichever terminal of secondary winding 118' is positive and through the corresponding one of diodes 135' or 136', thence through diode 141' and resistor 145' to terminal 113'. This current flows through the control voltage source (to be described) to terminal 114' thence through resistor 146' the parallel combination of resistor 142' and the base emitter junction of transistor 140' and then through diode 137' or diode 138' whichever of the terminals of the secondary winding is negative. By reason of the amplification of transistor 140' a loading current flows therethrough of sufficient magnitude to limit the peak voltage across secondary winding 118' to a value only slightly above the value of the control voltage from the control voltage source connected across terminals 113' and 114'. This also effects the corresponding voltage across primary winding 117' and controls the amount of lamp energization. Control current flows through clipping circuit 123' in a direction to supply energy to the control voltage source connected across terminals 113' and 114'. Transformer 116' isolates input terminals 113' and 114' from the remainder of the control circuit 10. As a result, control lines from a number of dimming interface circuits (such as circuit 10) of this design can be connected in parallel to a common control voltage source connected across terminals 113' and 114'. Resistors 145' and 146' together with capacitors 147' and 150' provide filtering to prevent transmission to input terminals 113' and 114' of switching noise generated in the controller circuitry.

The bridge circuit formed by diodes 135'-138' operates in conjunction with transistor 140' to limit the AC voltage at the terminals of secondary winding 118'. The high coefficient of coupling between primary and secondary windings 117' and 118' maintains the voltages across those windings substantially equal. Resistor 121' prevents undue loading of the AC source which is provided by line 98 from output circuit 20 (FIG. 2).

Level shift circuit 122' comprises a transistor 151' the emitter of which is connected through a protective diode to the lower end of primary winding 117'. The collector of transistor 151' is connected to ground. A reverse poled diode 153' is connected in parallel with the series combination of transistor 151' and diode 152' so that current may be conducted in both positive and negative half cycles of the applied AC voltage. The base of transistor 151' is connected through a resistor 154' to ground and through a resistor 155' and line 42 to the aforementioned terminal VREG of control circuit 36 (FIG. 1) from which a regulated voltage is supplied. Thermistor 156' is connected in parallel with resistor 155'. Level shift circuit 122' operates to add a positive DC voltage level to the voltage across primary 117' approximately equal to the voltage at terminal VREG. Transistor 151' is operative as a buffer to limit the required current drain on line 42 from terminal VREG. Thermistor 156' improves the system performance especially at high temperatures. Without thermistor 156' the dimming operation has a strong temperature dependence. The negative temperature coefficient of thermistor 156' in conjunction with resistor 154' and 155' offsets temperature effects of diode voltage drops during dimming operation. Peak detector and scaling circuit 124' comprises a diode 158' the anode of which is connected to the upper end of primary winding 117'. The cathode of diode 158' is connected to ground through a capacitor 160' and through a voltage divider formed by resistors 161' and 162'. Output line 125' is connected to the junction of resistors 161' and 162'. During half cycles when the upper end of primary winding 117' is positive capacitor 160' is charged to a level equal to the voltage across primary winding 117' plus the voltage developed by level shift circuit 122'. Part of the voltage developed across capacitor 160' is applied to comparator 164'. The magnitude of this voltage depends upon the relative values of resistors 161' and 162'.

Comparator circuit 126' comprises a comparator 164' which is supplied with an operating voltage from terminal VSUPPLY of control circuit 36 along line 39. A minus input of comparator 164' is connected through line 198 to terminal CVCO of control circuit 36. The plus input of comparator 164' is connected through a resistor 165' to output line 125' of peak detector and scaling circuit 124'. The output of comparator 164' is connected to line 131 through a resistor 166' to its plus input and through a resistor 167' to terminal VSUPPLY by way of line 39.

As stated earlier capacitor 200 (FIG. 13) is charged and discharged by the control circuit 36 to develop a periodically varying triangular wave form at line 198 Comparator 164' is triggered to an "on" state when the voltage from peak detector and scaling circuit 124' along line 125' is greater that the level of the triangular waveform applied through line 198. As a result pulses are developed at output line 131' having durations controlled by the level of the signal applied along line 125'.

Analog switch circuit 132' comprises an integrated circuit analog switch component 168' which is supplied with an operating voltage along line 39. Resistor 170' is connected across switch 168'. By way of example switch 168' may be ¼th of a type MC14066BCP Quad CMOS analog switch. It provides an effective short circuit or open circuit depending upon the control signal it receives from comparator circuit 126' through line 131'. A short circuit is developed from a high input and an open circuit is developed from a low input.

In operation, the application of a resistance between terminals 113' and 114' (FIG. 14) changes the voltage across secondary 118'. This is reflected back to primary 117' and changes the voltage applied to the positive input of comparator 164'. For example, if terminals 113' and 114' are maintained in a virtual open circuit condition, the voltage applied to secondary 118' is sufficient for zener diode 148' to conduct and the voltage applied to the positive terminal of comparator 164' keeps switch 168' virtually constantly closed. As a result, the operation of lamps 11 and 12 is Virtually as it would be if the circuitry of FIG. 9 was in the circuit, i.e. line 133' is connected directly to line 134' and a direct connection exists between resistor 242 and capacitor 241 on both sides of each.

If terminals 113' and 114' are short circuited, zener diode 148' cannot conduct. Transistor 140' is turned on because of the current flowing between terminals 113' and 114' and that through resistor 142'. This reduces the voltage across secondary 118' and primary 117'. The voltage drop across the resistor 121' thereby increases and the voltage applied to the positive terminal of comparator 164' decreases. This increases the resistance between leads 133' and 134' because switch 168' is open more than it is closed. As a consequence, the signal to the CRECT terminal of control circuit 36 is reduced and lamps 11 and 12 are operated in a dimmed condition. The dimmed condition takes place because increasing the resistance in line CRECT reduces the output of lamp correction error amplifier 231 (FIG. 12) which causes current source 230 to sink more current. This, in turn, (through line 206) causes the pulse-switch modulation and oscillator circuitry (FIG. 8) to charge and discharge capacitors 200 and 210 more rapidly. As a result, the frequencies of operation of the preconditioner circuit 28 and half bridge 24 are increased. With an increase in frequency of half bridge 24, the impedance of output circuit 20 is increased and the lamp current is decreased.

Figure 15:
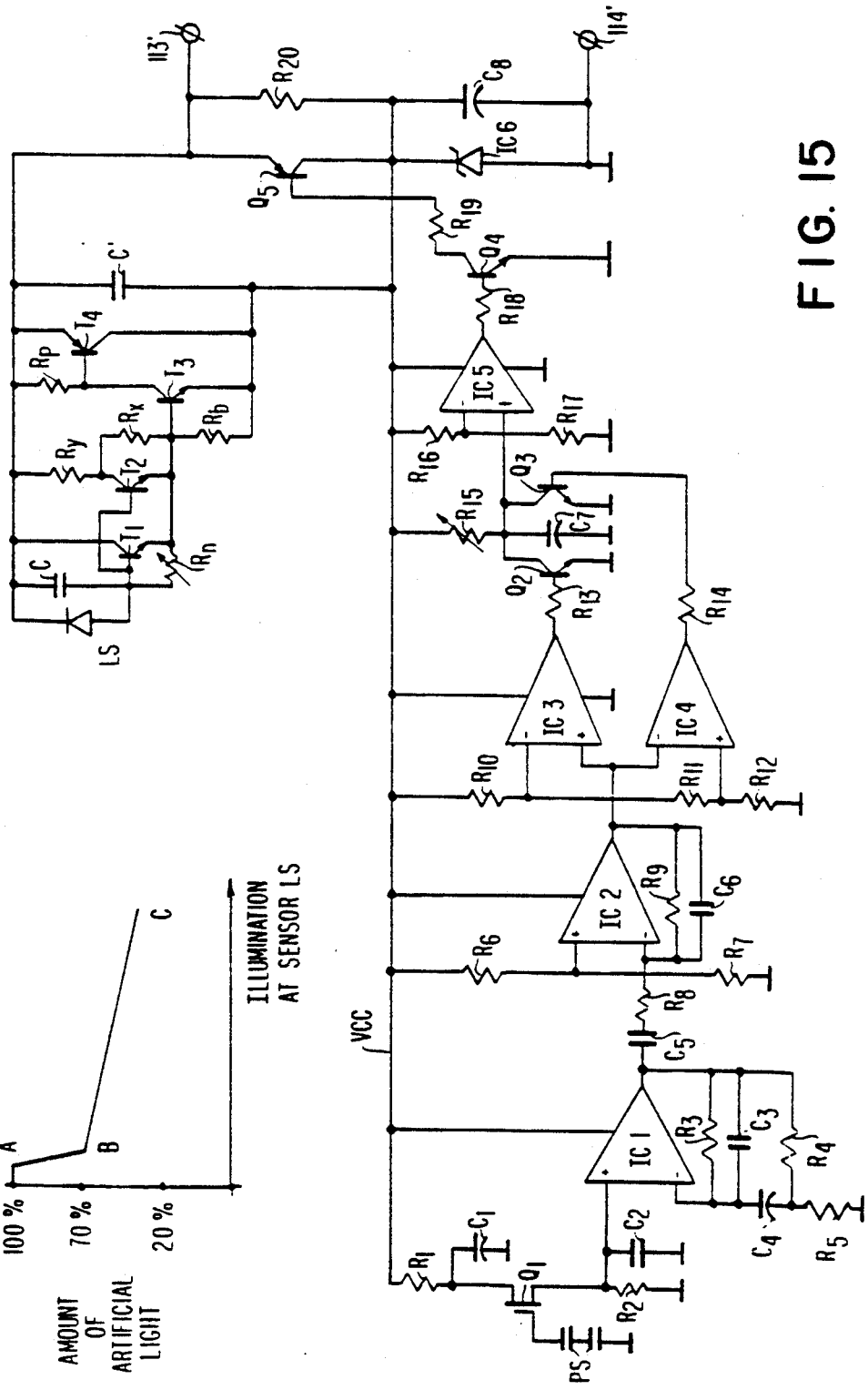
FIG. 15 is a circuit diagram of a motion and light sensor in accordance with the invention.

Motion Sensor (FIG. 15)

A preferred embodiment of a motion sensor for use with the lamp controller and dimmer previously described is shown in FIG. 15. Such a sensor would be useful in dimming lamps in a room when there is no activity in the room and for brightening those lamps when the sensor senses that there is activity in the room. The apparatus comprises a pyroelectric sensor PS. This unit produces signals which vary in time and whose amplitude increases as it senses increasing infrared radiation. In operation with resistors $R_1$ and $R_2$, capacitances $C_1$ and $C_2$ and transistor $T_1$, the signals from sensor PS are applied to the positive input of a first amplifier stage $IC_1$. As indicated in FIG. 15, capacitance $C_1$, sensor PS, resistor $R_2$ and capacitor $C_2$ are all connected to a common return line as are various other elements of FIG. 15 as indicated by the small horizontal line shown at the bottom of each of the elements connected to the return line. Resistors $R_3$, $R_4$ and $R_5$ together with capacitors $C_3$ and $C_4$ are selected in order to give operational amplifier $IC_1$ a high AC gain. The output of operational amplifier $IC_1$ is fed through capacitor $C_5$ and resistor $R_8$ to the inverting input of a second stage amplifier formed by operational amplifier $IC_2$ Resistors $R_6$, $R_7$, $R_9$ and capacitor $C_6$ are selected to provide operational amplifier $IC_2$ with a high AC gain also. Since the input from operational amplifier $IC_1$ is applied to the inverting input of operational amplifier $IC_2$, the output of the latter amplifier is an amplified inversion of its input.

The output of amplifier $IC_2$ is fed to what is termed a "window comparator" formed by amplifiers $IC_3$ and $IC_4$. Amplifier $IC_3$ filters out positive signals received from amplifier $IC_2$ below a particular value whereas amplifier $IC_4$ filters out negative signals above a particular value. In this way, background radiation which might impinge on pyroelectric sensor PS is filtered such that the apparatus is insensitive to such background radiation. The magnitudes of the positive and negative signals which are filtered out is determined by the resistance values of resistors $R_{10}$, $R_{11}$ and $R_{12}$.

The outputs of amplifiers $IC_3$ and $IC_4$ pass through resistors R13 and R14, respectively to turn on either of transistors Q2 and Q3 in the presence of sufficient motion as sensed by sensor PS. Preferably, transistors Q2 and Q3 are matched, that is, have substantially the same operating characteristics. With either of transistors Q2 or Q3 on, capacitor $C_7$ is discharged quickly through either of the low impedance collector-emitter paths so provided. Motion sensed by pyroelectric sensor PS discharges capacitor $C_7$ rapidly to brighten lamps 11 and 12 with a relatively short time delay if they were at their dimmed condition, as will be explained. In response to the indication of a lack of motion by pyroelectric sensor PS, capacitor $C_7$ charges slowly through rheostat $R_{15}$. In this way, motion sensed by pyroelectric sensor PS brightens lamps 11 and 12 from their dimmed condition with a relatively short delay. The lack of motion dims lamps 11 and 12 from their brightened condition after a time delay determined by the magnitudes of capacitor $C_7$ and rheostat $R_{15}$ which is relatively longer than the time delay for brightening the lamps.

The voltage representative of the charge on capacitor $C_7$ is applied to the positive input of comparator $IC_5$ which compares it with a threshold voltage established by resistors $R_{16}$ and $R_{17}$. If the voltage at the positive input is higher than the threshold voltage, the output of comparator $IC_5$ is high and is applied through resistor $R_{18}$ to turn on transistor $Q_4$.

Transistors $Q_4$ and $Q_5$ together with resistor $R_{19}$, and zener diode $IC_6$ form a switch for switching the voltage across terminals 113' and 114' depending upon whether or not pyroelectric sensor PS senses motion. If motion is sensed, the output of comparator $IC_5$ is low and transistors $Q_4$ is turned off. As a result, transistor $Q_5$ is also maintained in an off condition and resistor $R_{20}$ is in series circuit with Adjustable Micropower Voltage Reference $IC_6$. Under these conditions, the voltage applied across terminals 113' and 114' by secondary 118' (FIG. 14) of transformer 116' can remain high as can that across primary 117' of transformer 116'. Switch 132' therefore can remain substantially closed and as a consequence, lamps 11 and 12 can operate at what may be called a "fully lit". condition.

Should motion in the vicinity of pyroelectric sensor PS cease, comparator $IC_5$ produces a high signal to turn transistor $Q_4$ on. As a result, transistor $Q_5$ is also turned on short-circuiting resistor $R_{20}$. This causes the current being sourced by terminals 113' and 114' to increase in value while the voltage across those terminals decreases in value to approximately the voltage drop across Adjustable Micropower Voltage Reference $IC_6$ (such as a National Semiconductor Corp. LM 185). This voltage is reflected back to the upper terminal of primary 117' (FIG. 14) and causes switch 132' to remain in the substantially open condition causing lamps 11 and 12 to operate in a "dimmed" condition.

Adjustable Micropower Voltage Reference $IC_6$ forms a voltage regulating means for producing the operating voltage for amplifiers $IC_1$ through $IC_5$ along line $V_{cc}$. The voltage regulating means is capable of maintaining the voltage along lines $V_{cc}$ within an acceptable range for the operation of amplifiers $IC_1$ through $IC_5$ notwithstanding the voltage across terminals 113' and 114' changes from high to low depending upon whether resistor $R_{20}$ is in series circuit with Adjustable Micropower Voltage Reference $IC_6$ or whether it is shorted by transistor $Q_5$.

From the foregoing, it will be understood that the switch formed by transistor $Q_4$ and $Q_5$ together with the voltage regulating means identified above receive their operating voltage across terminals 113' and 114' and their power for operation from the previously described lamp controller voltage across secondary 118'. The amplifiers $IC_1$ through $IC_5$ of the control signal means of FIG. 15 receive their operating voltage through the Voltage regulator means along line $V_{cc}$. As a consequence, none of the previously described controlled signal means of FIG. 15 requires a source of voltage independent of the lamp controller.

Superimposed upon the previously described motion sensor of FIG. 15 is a light sensor arrangement including light sensor LS and transistors $T_1$-$T_4$ with associated resistive elements and capacitors. This circuitry is connected to terminal 113' and line $V_{cc}$. As can be seen in FIG. 15 hereof, there is provided a light sensor LS which senses light at a particular location. Light sensor LS is connected across capacitor C, one end of which is connected to the base of NPN transistor $T_1$. The other end of capacitor C is connected to the collector of transistor $T_1$.

The emitter of transistor $T_1$ is connected to one end of rheostat $R_h$, the other end of which is connected to one end of light sensor LS and to the base of transistor $T_1$. The emitter of transistor $T_1$ is also connected to the base of NPN transistor $T_3$ and to the emitter of NPN transistor $T_2$. The bases of transistor $T_1$ and $T_2$ are interconnected. The collector of transistor $T_2$ is connected to one end of resistor $R_y$, the other end of which is connected to the other end of capacitor C. The emitter of transistor $T_2$ is also connected to one end of resistor $R_b$, the other end of which is connected to line $V_{cc}$.

Connected across the emitter and collector of transistor $T_2$ is resistor $R_x$. The collector of transistor $T_3$ is connected to one end of resistor $R_p$, the other end of which is connected to the other end of capacitor C. The one end of resistor $R_p$ is also connected to the base of PNP transistor $T_4$. The other end of resistor $R_p$ is connected to the emitter of transistor $T_4$. The emitter of transistor $T_4$ is also connected to terminal 113'. The collector of transistor $T_4$ is connected to line $V_{cc}$. One end of a capacitor C' is connected to terminal 113' and to the emitter of transistor $T_4$. The other end of capacitor C' is connected to line $V_{cc}$ and to the collector of transistor $T_4$. Therefore, the output of the light sensor arrangement is in parallel with resistor $R_{20}$. Consequently, when resistor $R_{20}$ is shorted by transistor $Q_5$, the light sensor arrangement is disabled from controlling the light intensity of the lamp.

Figure 16:
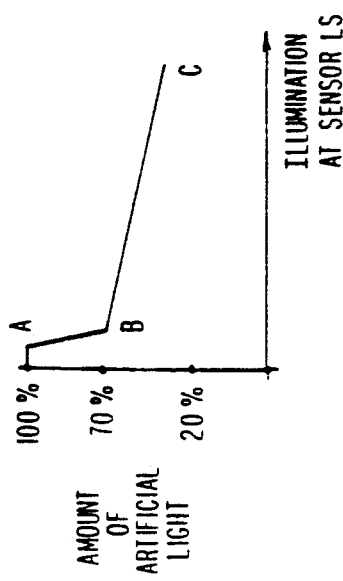
FIG. 16 is a graph plotting the illumination at the light sensor of the circuitry of FIG. 15 against the amount of artificial light provided by the lighting arrangement of the invention.

The curve shown in FIG. 16 is the result of experimentation at work places. Those skilled in the art will understand from the disclosure herein that different curve slopes may be employed. The curve of FIG. 16 represents the output of fluorescent lamps controlled in accordance with the invention versus the illumination at the light sensor. The upper steep slope portion of the curve, that is, the portion from A to B provides lumen maintenance control and ambient light regulation. The lower part with the more moderate slope, that is, portion B to C of the curve performs ambient light regulation only. It is to be understood that this curve has been selected to provide optimum electrical energy use and optimum quality of lighting.

In operation, transistors $T_1$, $T_2$, $T_3$ and $T_4$ are provided power for operation from the dimming interface circuit 110' of FIG. 13. No auxiliary power supply is required with the circuitry of FIG. 13. Rheostat $R_h$ acts as a threshold control or selection means. Transistor $T_4$ is the main current sink of the invention. Transistor $T_3$ operates as a regulation amplifier and as a partial current sink. Transistors $T_1$ and $T_2$ form a variable gain photo current amplifier. Transistors $T_1$ and $T_2$ work in such a way that at low natural light levels they have a high current gain. At this high gain the upper portion A to B of the curve of FIG. 16 is provided substantially by the fluorescent lamp or lamps being controlled. At higher natural light levels transistor $T_2$ saturates and this results in a relatively low current gain of the amplifier formed by transistors $T_1$ and $T_2$. This provides the more moderate portion of each curve from point B to point C. The value of resistor $R_y$ and the current gain of transistors $T_1$ and $T_2$ are what determine the location B on each of the curves of FIG. 2.

Resistors $R_y$ and $R_x$ are selected to obtain the desired steep slope of the curve between its A point and its B point. $R_p$ serves to establish a bias for transistor $T_4$. $R_b$ serves to establish initial voltage gain for the circuit. Capacitors C and C' provide voltage filtering.

It should be apparent that various modifications of the above will be evident to those skilled in the art and that the arrangement described herein is for illustrative purposes and is not to be considered restrictive.

I claim:

1. A fluorescent lamp lighting arrangement including a fluorescent lamp, lamp controller means for controlling the light intensity of said lamp, control signal means responding to a predetermined stimulus and producing a control signal when stimulus occurs, operating means responding to said control signal to cause said controller means to change the light intensity of said lamp, said operating means including first and second stages wherein said first stage includes amplifier means for amplifying said control signal and said second stage includes voltage regulating means for regulating a first operating voltage applied to said amplifier means based on a second operating voltage received from said lamp controller means.

2. The fluorescent lamp lighting arrangement as claimed in claim 1, wherein said voltage regulating means includes switch means for reducing the second operating voltage applied to said voltage regulating means in the absence of said control signal from the magnitude of said second operating voltage applied in the presence of said control signal, said voltage regulating means providing substantially the same first operating voltage to said amplifier means regardless of the magnitude of said second operating voltage applied to said voltage regulating means.

3. The fluorescent lamp lighting arrangement as claimed in claim 2, wherein said control signal means includes a pyroelectric sensor serving as a motion detector.

4. The fluorescent lamp lighting arrangement as claimed in claim 3, wherein said operating means operates in response to said control signal to cause said controller means to raise the light intensity of said lamps in the presence of movement sensed by said motion detector.

5. The fluorescent lamp lighting arrangement as claimed in claim 4, wherein said control signal means causes said controller means to dim the light intensity of said lamps in the absence of motion sensed by said motion detector.

6. The fluorescent lamp lighting arrangement as claimed in claim 5, wherein said controller means raises the light intensity of said lamp from a dimmed condition with a shorter time delay than the time delay which it provides when it dims said lamp in the absence of motion.

7. A fluorescent lamp lighting arrangement including a fluorescent lamp, lamp controller means for controlling the light intensity of said lamp, control signal means responding to a predetermined stimulus and producing a control signal when said stimulus occurs, operating means responding to said control signal to cause said controller means to change the light intensity of said lamp, said operating means including a light control circuit which responds to said control signal and operates to control the amount of light provided by said fluorescent lamp at a prescribed location in accordance with a predetermined curve, said light control circuit including light sensing means sensing the amount of illumination at the prescribed location provided by natural light and by said fluorescent lamp, said predetermined curve having a steep slope when said light sensing means indicates said fluorescent lamp should provide a high amount of light and a more moderate slope when said light sensing means indicates said fluorescent lamp should provide a lesser amount than said high amount, said light control circuit including determination means for determining at what amount of light from said fluorescent lamp said curve is transposed from said steep slope to said more moderate slope.

8. The fluorescent lamp lighting arrangement as claimed in claim 7, wherein said light control circuit includes a photo amplifier comprising a pair of transistors which operate at a high current gain at low natural light levels.

9. The fluorescent lamp lighting arrangement as claimed in claim 8, wherein one of said pair of transistors saturates at a relatively high natural light level.

10. The fluorescent lamp lighting arrangement as claimed in claim 9, wherein said determination means includes a resistor connected to the collector of said one of said pair of transistors.

11. The fluorescent lamp lighting arrangement as claimed in claim 10, wherein said determination means includes a resistor connected across the collector and emitter of said one of said pair of transistors.

12. A fluorescent lamp lighting arrangement including a fluorescent lamp, lamp controller means for controlling the light intensity of said lamp, control signal means responding to predetermined stimuli and producing first and second control signals when said stimuli occur, operating means responding to said first and second control signals to cause said controller means to change the light intensity of said lamp, said operating means including first and second stages, said first stage including amplifier means for amplifying said first control signal, said second stage including voltage regulating means for regulating a first operating voltage applied to said amplifier means based on a second operating voltage received from said lamp controller means, said operating means further including light control means responsive to said second control signal and for controlling the amount of light provided by said fluorescent lamp at a prescribed location, said light control means including light sensing means for sensing the amount of illumination at the prescribed location provided by natural light and by said fluorescent lamp, said light control means including determination means for determining the amount of light to be provided by said fluorescent lamp.

13. The fluorescent lamp lighting arrangement as claimed in claim 1, said light control means further including a photo amplifier comprising a pair of transistors which operate at a high current gain at low natural light levels.

14. The fluorescent lamp lighting arrangement as claimed in claim 13, wherein one of said pair of transistors saturates at a relatively high natural light level.

15. The fluorescent lamp lighting arrangement as claimed in claim 14, wherein said determination means includes a resistor connected to the collector of said one of said transistors.

16. The fluorescent lamp lighting arrangement as claimed in claim 15, wherein said determination means includes a resistor connected across the collector and emitter of said one of said pair of transistors.

17. The fluorescent lamp lighting arrangement as claimed in claim 12, wherein said voltage regulating means includes switch means for reducing the second operating voltage applied to said voltage regulating means in the absence of said first control signal relative to said second operating voltage applied in the presence of said first control signal, said voltage regulating means providing substantially the same first operating voltage to said amplifier means regardless of the magnitude of said second operating voltage applied to said voltage regulating means.

18. The fluorescent lamp lighting arrangement as claimed in claim 16, wherein said control signal means includes a pyroelectric sensor serving as as a motion detector.

19. The fluorescent lamp lighting arrangement as claimed in claim 18, wherein said operating means in response to said first control signal causes said controller means to raise the light intensity of said lamp in the presence of movement sensed by said motion detector and to lower the light intensity of said lamp in the absence of motion sensed by said motion detector.

20. The fluorescent lamp lighting arrangement as claimed in claim 19, wherein said controller means raises the light intensity of said lamp from a dimmed condition with a shorter time delay than the time delay which it provides before it dims said lamp in the absence of motion.

21. The fluorescent lamp lighting arrangement as claimed in claim 1, wherein said amplifier means include comparator circuit means for rendering said lamp controller means insensitive to said control signal based on the magnitude of the latter.

22. The fluorescent lamp lighting arrangement as claimed in claim 21, wherein said comparator circuit means includes a pair of matched transistors.

23. The fluorescent lamp lighting arrangement as claimed in claim 17, wherein said light control means is coupled to said switch means of said voltage regulating means.

24. The fluorescent lamp lighting arrangement as claimed in claim 23, wherein said switch means is further operable for disabling control by said light control means of said fluorescent lamp in the absence of said first control signal.

25. The fluorescent lamp lighting arrangement as claimed in claim 17 wherein said control signal means includes a motion detector, said operating means in response to said first control signal causing said controller means to raise the light intensity of said lamp in the presence of movement sensed by said motion detector and to lower the light intensity of said lamp in the absence of motion sensed by said motion detector.

26. The fluorescent lamp lighting arrangement as claimed in claim 24, wherein said control signal means includes a motion detector, said operating means in response to said first control signal causing said controller means to raise the light intensity of said lamp in the presence of movement sensed by said motion detector and to lower the light intensity of said lamp in the absence of motion sensed by said motion detector.

* * * * *